(12) United States Patent
Inglis et al.

(10) Patent No.: US 11,125,896 B2
(45) Date of Patent: *Sep. 21, 2021

(54) ADVANCED THERMAL NEUTRON DETECTORS AND ASSOCIATED METHODS

(71) Applicant: SILVERSIDE DETECTORS INC., Cambridge, MA (US)

(72) Inventors: Andrew Inglis, Brookline, MA (US); Alison Forsyth, Somerville, MA (US); Thomas Nadovich, Somerville, MA (US); Timothy Teal, Brighton, MA (US); Philip Taber, Arlington, MA (US); Hidefumi Tomita, Pittsburgh, PA (US)

(73) Assignee: Silverside Detectors Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,147

(22) Filed: Feb. 26, 2020

(65) Prior Publication Data

US 2020/0191982 A1 Jun. 18, 2020

Related U.S. Application Data

(63) Continuation of application No. 16/381,602, filed on Apr. 11, 2019, now Pat. No. 10,613,237, which is a (Continued)

(51) Int. Cl.
*G01T 3/00* (2006.01)
*H01J 47/02* (2006.01)
*H01J 47/12* (2006.01)

(52) U.S. Cl.
CPC ............. *G01T 3/008* (2013.01); *G01T 3/00* (2013.01); *H01J 47/02* (2013.01); *H01J 47/12* (2013.01); *H01J 47/1205* (2013.01)

(58) Field of Classification Search
CPC .. G01T 3/008; G01T 3/00; H01J 47/02; H01J 47/12; H01J 47/1205

See application file for complete search history.

(56) References Cited

U.S. PATENT DOCUMENTS

| 2,440,167 A | 4/1948 | Broxon et al. |
| 4,365,159 A | 12/1982 | Young |

(Continued)

FOREIGN PATENT DOCUMENTS

| GB | 956555 A | 4/1964 |
| GB | 2490513 B | 11/2015 |

(Continued)

OTHER PUBLICATIONS

N. Colonna, et al., Simulations of Neutron Transport at Low Energy: A Comparison Between Geant and MCNP, Health Phys. 82(6):840-846, 2002. (Note: Year of publication is sufficiently earlier than the effective date of the present application).

(Continued)

*Primary Examiner* — Marcus H Taningco
(74) *Attorney, Agent, or Firm* — Pritzkau Patent Group LLC

(57) ABSTRACT

A narrow thermal neutron detector includes a slidably receivable ionization thermal neutron detector module within an overall housing body. An active sheet layer of the ionization thermal neutron detector module can be tensioned across its width. The ionization thermal neutron detector module can include module upper major surface extents and module lower surface extents such that, when installed within the housing body, the module upper major surface extents are in a first spaced apart confronting relationship with housing upper major surface extents to define a first clearance and module lower major surface extents are in a second spaced apart confronting relationship with housing lower major surface extents to define a second clearance to (Continued)

accommodate housing flexing due to ambient pressure change. The housing body can be formed with a single opening for receiving the ionization thermal neutron detection module or with opposing first and second opposing end openings.

18 Claims, 26 Drawing Sheets

Related U.S. Application Data continuation of application No. 15/952,610, filed on Apr. 13, 2018, now Pat. No. 10,302,781.

(60) Provisional application No. 62/485,941, filed on Apr. 15, 2017.

(56) References Cited

U.S. PATENT DOCUMENTS

| | | | |
|---|---|---|---|
| 4,447,727 A | 5/1984 | Friesenhahn | |
| 4,543,483 A | 9/1985 | Genrich | |
| 4,560,864 A | 12/1985 | Kinoshita et al. | |
| 4,785,186 A | 11/1988 | Street et al. | |
| 5,192,490 A | 3/1993 | Burel | |
| 5,796,110 A | 8/1998 | An et al. | |
| 7,078,705 B1 | 7/2006 | Ianakiev et al. | |
| 7,157,719 B2 | 1/2007 | Martoff et al. | |
| 8,519,350 B2 | 8/2013 | McGregor et al. | |
| 8,569,710 B2 | 10/2013 | Lacy | |
| 8,907,293 B2 | 12/2014 | Lacy | |
| 9,018,594 B2 | 4/2015 | Ahlen et al. | |
| 9,817,138 B2 | 11/2017 | McGregor et al. | |
| 9,847,215 B2 | 12/2017 | Degtiarenko et al. | |
| 10,613,237 B2 * | 4/2020 | Inglis | G01T 3/00 |
| 2002/0139935 A1 | 10/2002 | Klein et al. | |
| 2003/0213917 A1 | 11/2003 | Menlove et al. | |
| 2005/0220246 A1 | 10/2005 | Masterov et al. | |
| 2006/0138340 A1 | 6/2006 | Ianakiev et al. | |
| 2006/0267054 A1 | 11/2006 | Martin et al. | |
| 2007/0018110 A1 | 1/2007 | McGregor et al. | |
| 2007/0122948 A1 | 5/2007 | Wei et al. | |
| 2008/0128628 A1 | 6/2008 | Moses et al. | |
| 2008/0296506 A1 | 12/2008 | Clarke et al. | |
| 2008/0315109 A1 | 12/2008 | Stephan et al. | |
| 2009/0014662 A1 | 1/2009 | Suhami | |
| 2010/0019164 A1 | 1/2010 | Stephan et al. | |
| 2010/0301226 A1 | 12/2010 | Lacy | |
| 2011/0102620 A1 | 5/2011 | Sakano et al. | |
| 2011/0108738 A1 | 5/2011 | Patrick et al. | |
| 2011/0204243 A1 | 8/2011 | Bendahan et al. | |
| 2011/0266643 A1 | 11/2011 | Engelmann et al. | |
| 2012/0217406 A1 | 8/2012 | McGregor et al. | |
| 2013/0020492 A1 | 1/2013 | Derzon et al. | |
| 2013/0068941 A1 | 3/2013 | Nikitin | |
| 2013/0068957 A1 | 3/2013 | Stephan et al. | |
| 2013/0228696 A1 | 9/2013 | McGregor et al. | |
| 2013/0341519 A1 | 12/2013 | Li et al. | |
| 2014/0042330 A1 | 2/2014 | Gozani et al. | |
| 2014/0077091 A1 | 3/2014 | Ahlen et al. | |
| 2014/0097351 A1 | 4/2014 | Lacy | |
| 2014/0117246 A1 | 5/2014 | Zhou et al. | |
| 2014/0197321 A1 | 7/2014 | Bendahan et al. | |
| 2014/0252520 A1 | 9/2014 | Dahal et al. | |
| 2014/0321588 A1 | 10/2014 | Gozani et al. | |
| 2015/0355345 A1 | 12/2015 | Neyland | |
| 2016/0018538 A1 | 1/2016 | Bendahan et al. | |
| 2017/0023684 A1 | 1/2017 | Inglis et al. | |
| 2017/0176632 A1 | 6/2017 | Manclossi et al. | |
| 2017/0276810 A1 | 9/2017 | Clarke | |

FOREIGN PATENT DOCUMENTS

| | | |
|---|---|---|
| JP | 2015075393 A | 4/2015 |
| WO | 2011025853 A1 | 3/2011 |
| WO | 2016022232 A3 | 2/2016 |
| WO | 2016061553 A1 | 4/2016 |
| WO | 2016022232 A3 | 5/2016 |

OTHER PUBLICATIONS

Prosecution History of Co-Pending U.S. Appl. No. 15/039,842, as of Nov. 19, 2018.
Prosecution History of Co-Pending U.S. Appl. No. 15/488,382, as of Dec. 7, 2018.
The International Search Report and the Written Opinion of the International Searching Authority for International Application No. PCT/US2015/056093 which is associated with U.S. Appl. No. 15/039,842, dated Mar. 17, 2016, Alexandria, VA.
The International Search Report and the Written Opinion of the International Searching Authority for International Application No. PCT/US2018/027592 which is associated with U.S. Appl. No. 15/488,382, Sep. 20, 2018, Jerusalem, Israel.
Updated Prosecution History of previously cited Co-Pending U.S. Appl. No. 15/039,842, as of Dec. 7, 2018.
W.J. Nellis, Slowing Down Distance and Times of 0.1- to 14-MeV Neutrons in Hydrogenous Materials, American Journal of Physics No. 5, May 5, 1977.
Prosecution History Update for Co-Pending U.S. Appl. No. 15/488,382, as of Mar. 10, 2020.
The Extended European Search Report for European Application No. 18835326.2, which is related to PCT/US2018/027658 which is related to U.S. Appl. No. 15/952,610, dated Nov. 2, 2020.

* cited by examiner

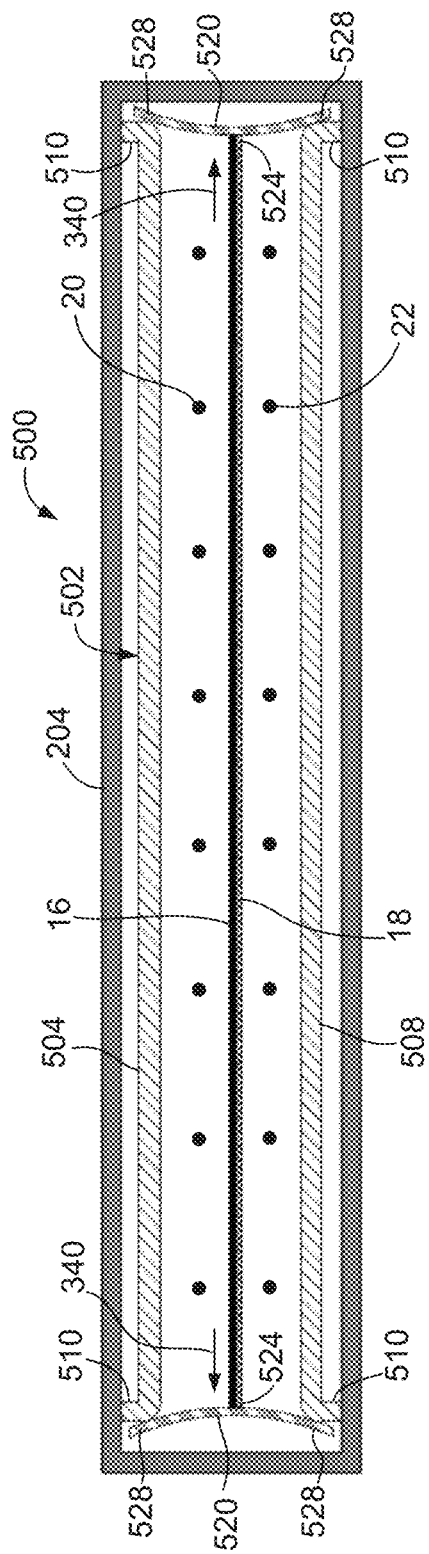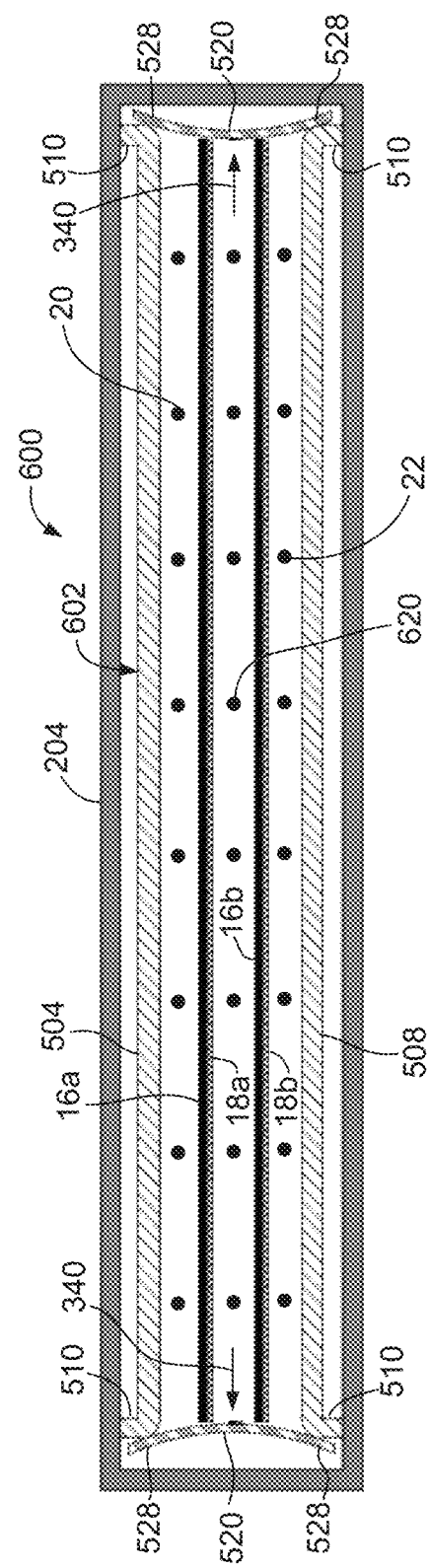
FIGURE 17
FIGURE 18

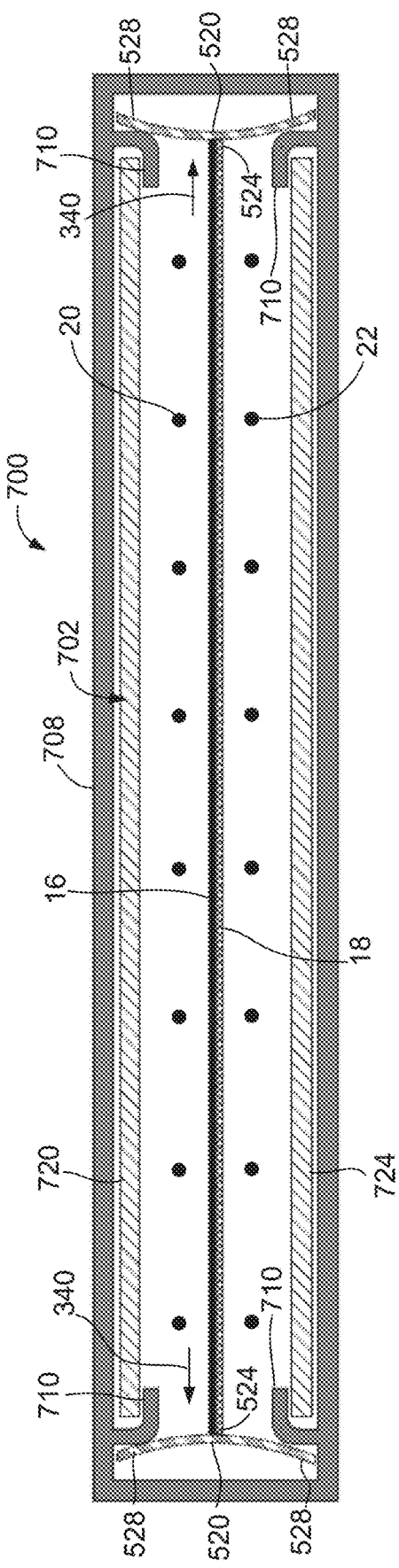
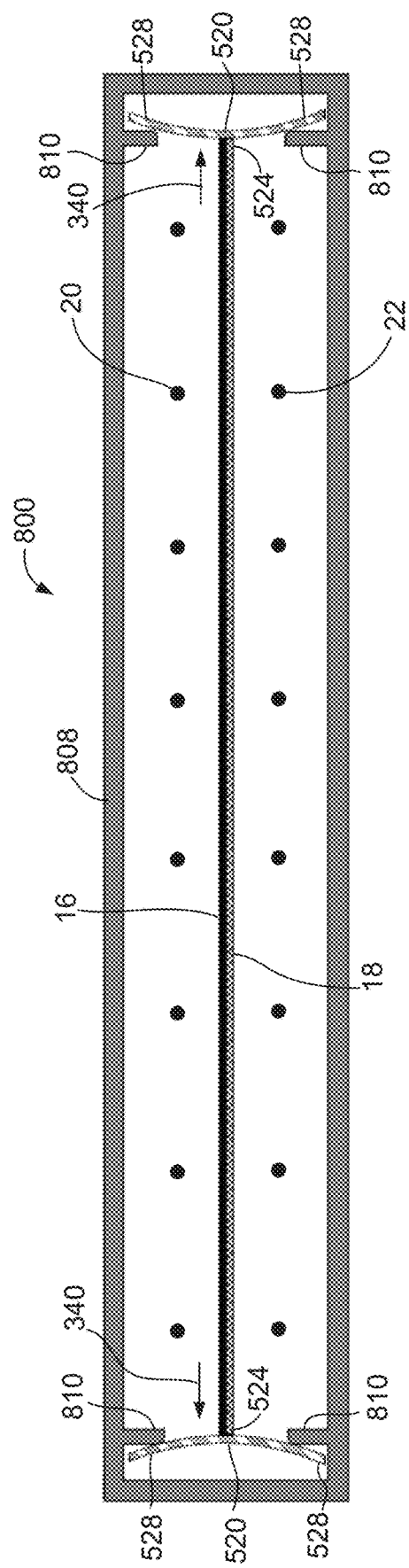
FIGURE 19
FIGURE 20

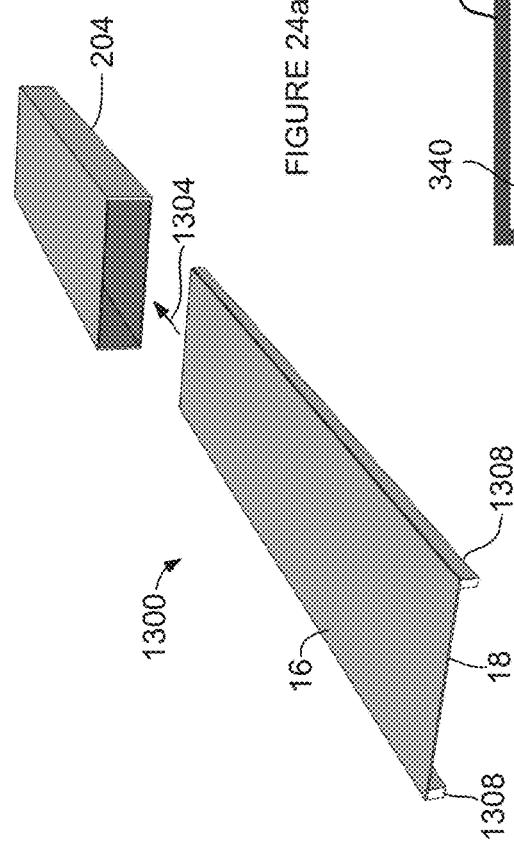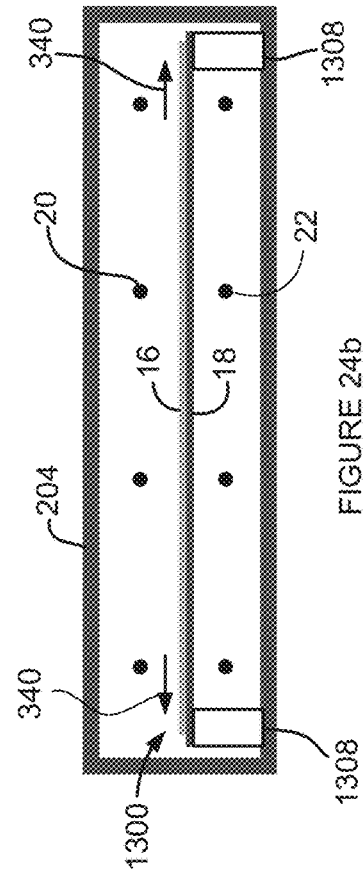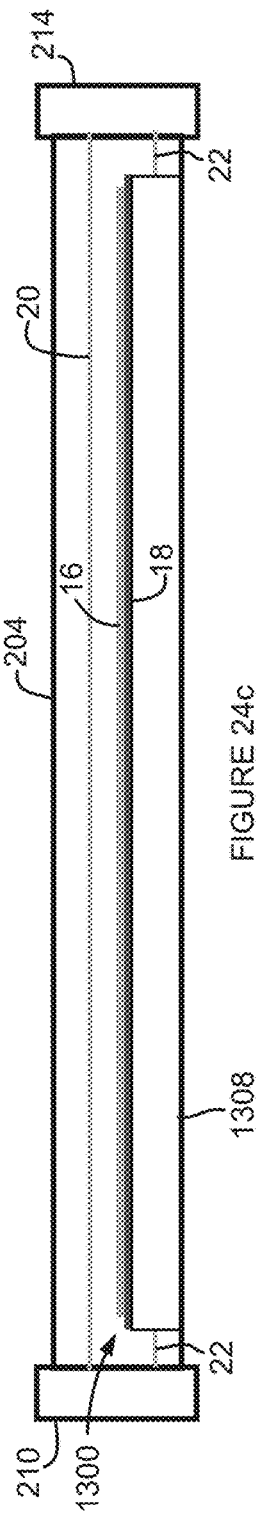
FIGURE 24a
FIGURE 24b
FIGURE 24c

ADVANCED THERMAL NEUTRON DETECTORS AND ASSOCIATED METHODS

RELATED APPLICATIONS

The present Application is a continuation of co-pending U.S. application Ser. No. 16/381,602, filed on Apr. 11, 2019; which is a continuation of U.S. application Ser. No. 15/952,610, filed on Apr. 13, 2018 and issued as U.S. Pat. No. 10,302,781 on May, 28, 2019; which claims priority from U.S. Provisional Patent Application Ser. No. 62/485,941 entitled ADVANCED THERMAL NEUTRON DETECTORS, filed on Apr. 15, 2017, each of which is hereby incorporated by reference in its entirety.

STATEMENT REGARDING FEDERALLY SPONSORED RESEARCH OR DEVELOPMENT

This invention was made with Government support under HR0011-14-C-0098 awarded by the Defense Advanced Research Projects Agency. The Government has certain rights in the invention.

BACKGROUND

The present invention is at least generally related to the field of detecting thermal neutrons and, more particularly, to advanced thermal neutron detectors and associated methods. Commonly owned U.S. patent application Ser. No. 15/488,382, hereinafter the '382 Application, entitled ADVANCED THERMAL NEUTRON DETECTION SYSTEM AND METHOD, which is hereby incorporated by reference, describes concerns relating to the illicit movement of nuclear materials such as, for example, plutonium and uranium, as well as prior art approaches that have been taken in attempting to detect such materials. Commonly owned U.S. application Ser. No. 15/039,842, hereinafter the '842 Application, entitled FISSILE NEUTRON DETECTOR which is hereby incorporated by reference, likewise discusses such concerns relating to illicit movement. As noted in the '382 and '842 Applications, 1.2 million kilograms of plutonium have been produced since World War II. Given the abundance of plutonium and that the key signature of plutonium is neutron emission, it remains that neutron detection is an essential component of threat detection capability.

One approach to threat detection capability resides in the use of large surface area neutron detectors. A large surface area neutron detector can be placed, for example, to the side of a road. Simulations, as well as empirical tests, have shown that a fissile neutron source in a vehicle can be detected by a detector so positioned. When the surface area of the neutron detector is large (approximately one square meter) with approximately a 10 to 15 percent intrinsic efficiency to fissile neutrons, the number of fissile neutrons measured by the neutron detector can indicate the fissile source and alert authorities to the presence of the source.

A main component of a fissile neutron detector system that can detect fissile sources is a thermal neutron detector. Fissile neutrons have an energy range of around 100 keV to 10 MeV. A thermal neutron is a neutron that has an energy of less than 0.1 eV. Thermal neutron detectors are used in combination with a moderating material to slow the fissile neutrons down to thermal energies that are then detectable by a thermal neutron detector.

FIG. 1 is a diagrammatic illustration, in elevation, of a prior art thermal neutron detector, generally indicated by the reference number 10. The detector includes a chamber 12 that is generally formed from an electrically conductive material and contains a readout gas 14 such as argon. The chamber or chamber walls can be hermetically sealed so that there is less than 1% loss of the readout gas and less than 1% ingress of atmospheric gases such as nitrogen, oxygen, and water vapor into the readout gas. Inside the chamber, an active sheet material 16 is bonded to a support structure 18. This active sheet material can be enriched lithium foil (Li-6). The support structure includes open areas that allow the active sheet material to be exposed to readout gas 14 above and below the support structure. Suitable examples serving as the support structure can be a honeycomb matrix, a wire mesh, or sheet metal where holes or apertures are cut out of the sheet metal.

The assembly comprising active sheet material 16 bonded to support structure 18 may be referred to herein as an ASM-SS (Active Sheet Material Support Structure). Within the readout gas, there is a first set of electrodes 20 above and second set of electrodes 22 below the ASM-SS. These electrodes are set to a high voltage (HV) by a power supply, including a high voltage source 30 and a series resistance 32, with respect to the ASM-SS as well as with respect to a top cathode surface 34 and a bottom cathode surface 36. Electrical interconnections 38 for the electrodes are indicated using dashed lines. The HV creates an electric field in the readout gas between the top cathode surface and the top surface of the ASM-SS, and between the bottom surface of the ASM-SS and the bottom cathode surface. Operation of thermal neutron detector 10 will be described immediately hereinafter.

Turning now to FIG. 2, a further enlarged fragmentary view of prior art detector 10 of FIG. 1 is shown. First set 20 and second set 22 of electrodes are shown as energized such that an electric field 40 is present. When a thermal neutron 44, traveling on a path indicated by a dashed line 44' impinges onto the thermal neutron detector and enters active sheet material 16, there is a probability that the thermal neutron can be captured by the active sheet material. In the case that the active sheet material is enriched lithium metal (Li-6), the capture of the neutron by a Li-6 atom produces a resulting Li-7 atom, which then decays into two daughter particles: an alpha particle 48 (consisting of two protons and two neutrons) and a triton particle 50 (consisting of one proton and two neutrons). These two particles travel in opposite directions, as shown, and lose energy as they travel through the Li-6. In the case that either the alpha particle or the triton enters the readout gas and still has sufficient kinetic energy (for example, the alpha or the triton has approximately 10% or more of its initial kinetic energy when it enters the readout gas), the daughter particles will ionize a multitude of atoms in the readout gas and create primary electrons 54 and primary positive ions 56.

Because of electric field 40 in the readout gas created by the HV, primary electrons 54 resulting from the ionization of the multitude of atoms will drift towards the nearest electrode, and the primary positive ions created by the ionization will drift towards the ASM-SS or the top or bottom cathode surfaces, depending on which is closer to the primary ion. Once the primary electrons reach a given distance from an electrode, which defines the so called Townsend avalanche region, the electric field is strong enough to accelerate the primary electrons fast enough that they begin to strip more electrons, denominated as secondary electrons 58 from the readout gas. These stripped secondary electrons in turn accelerate and strip more secondary electrons, creating a multiplication effect of secondary electron and secondary positive ion generation. The number of secondary electrons and secondary positive ions that are formed by this multiplication is referred to as the gas gain. The movement of the secondary positive ions created in the Townsend avalanche region 60 away from the electrode creates a movement of charge within the thermal neutron detector that is amplified by a signal amplifier 62 in electrical communication with the electrodes through a decoupling capacitor 64 and measured as a neutron signal 68 in the form of a pulse.

While thermal neutron detector 10 is generally effective in detecting thermal neutrons, Applicants recognize that there is a need for improvement in view of certain aspects of the operational environment to which the thermal neutron detector may be subjected.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a thermal neutron detector and associated methods are described for detecting thermal neutrons. In one aspect of the disclosure, the thermal neutron detector includes a main housing body defining first and second opposing end openings and a housing cavity therebetween. An ionization detector module may be referred to interchangeably as a thermal neutron detector module and includes a peripheral outline that is complementary to the main housing body within the housing cavity and is slidably receivable in an installed position within the housing cavity. The ionization detector module having a length, a width and a height with the height being less than each of the length and the width and supporting an active sheet layer to span at least a majority of the length and width. An electrode arrangement includes at least a first electrode and a second electrode within the main housing body in a spaced apart relationship with the active sheet layer, with the ionization detector module in the installed position, such that each of the first electrode and the second electrode is oppositely proximate to one of a pair of opposing major surfaces of the active sheet layer. A first end cap seals the first end opening of the elongated main housing body. A second end cap seals the second end opening of the main housing body. An electrical feedthrough extends through a selected one of the first end cap and the main housing body. An electrical conductor extends through the electrical feedthrough for electrical communication with the electrode arrangement. The elongated main housing and the first and second end caps cooperate to contain a readout gas in communication with the active sheet layer and the electrode arrangement such that, responsive to (i) an electrical bias applied to the electrode arrangement by the electrical conductor and (ii) incident thermal neutrons, an electrical detection current is generated on the electrode arrangement.

In another aspect of the present disclosure, a thermal neutron detector and associated methods are described for detecting thermal neutrons. The thermal neutron detector includes a main housing body defining first and second opposing end openings as well as a housing cavity therebetween. The main housing body includes housing upper major surface extents and opposing, housing lower major surface extents. An ionization detector module includes a peripheral outline that is complementary to the main housing body within the housing cavity when received therein, the ionization detector module having a width, a length, and a height where the height that is less than each of the length and the width. The ionization detector module supporting an active sheet layer to span a majority of the length and width. The ionization detector module further including module upper major surface extents and module lower surface extents. The ionization detector module installed within the main housing body such that the module upper major surface extents are in a first spaced apart confronting relationship with the housing upper major surface extents to define a first clearance therebetween and the module lower major surface extents are in a second spaced apart confronting relationship with the housing lower major surface extents to define a second clearance therebetween. An electrode arrangement includes at least a first electrode and a second electrode within the main housing body in a spaced apart relationship with the active sheet layer such that each of the first and second electrodes is oppositely proximate to one of a pair of opposing major surfaces of the active sheet layer. A first end cap seals the first end opening of the elongated main housing body including an electrical feedthrough. A second end cap seals the second end opening of the main housing body. An electrical conductor extends through the electrical feedthrough for electrical communication with the electrode arrangement. The main housing body and the first and second end caps cooperating to contain a readout gas in communication with the active sheet layer and the electrode arrangement and isolated from an ambient pressure such that, responsive to (i) an electrical bias applied to the electrode arrangement by the electrical conductor arrangement and (ii) incident thermal neutrons, an electrical detection current is generated on the electrode arrangement, and based on the first and second clearances, the housing upper and lower surface extents mechanically flex relative to the module upper and lower surface extents, respectively, responsive at least to an ambient pressure change to isolate the ionization detector module from deformations responsive to the ambient pressure change.

In another aspect of the present disclosure, a thermal neutron detector and associated methods are described for detecting thermal neutrons. The thermal neutron detector includes a main housing body defining an opening leading into an elongated housing cavity. An ionization detector module includes a peripheral outline that is complementary to the main housing body within the housing cavity and is slidably receivable through the opening to an installed position within the housing cavity, the ionization detector module having a length, a width, and a height with the height being less than each of the length and the width and supporting an active sheet layer to span at least a majority of the length and width. An electrode arrangement includes at least a first electrode and a second electrode within the main housing body in a spaced apart relationship with the active sheet layer, with the ionization detector module in the installed position, such that each of the first electrode and the second electrode is oppositely proximate to one of a pair of opposing major surfaces of the active sheet layer. A cap seals the opening of the elongated main housing body. An electrical feedthrough extends through a selected one of the cap and the main housing body. An electrical conductor extends through the electrical feedthrough for electrical communication with the electrode arrangement. The main housing body and end cap cooperate to contain a readout gas in communication with the active sheet layer and the electrode arrangement such that, responsive to (i) an electrical bias applied to the electrode arrangement by the electrical conductor and (ii) incident thermal neutrons, an electrical detection current is generated on the electrode arrangement.

In still another aspect of the present disclosure, a thermal neutron detector and associated methods are described for detecting thermal neutrons. The thermal neutron detector includes a main housing body defining first and second opposing end openings as well as a housing cavity therebetween. An ionization detector module includes a peripheral outline that is complementary to the main housing body and is slidably receivable in an installed position within the housing cavity, the ionization detector module having a module width, a module length and a module height where the module height is less than each of the module length and the module width and supporting an active sheet layer to span a majority of the module length and module width such that the active sheet layer is under tension along the module width. An electrode arrangement includes at least a first electrode and a second electrode within the main housing body in a spaced apart relationship with the active sheet layer such that each of the first and second electrodes is oppositely proximate to one of a pair of opposing major surfaces of the active sheet layer. A first end cap sealing the first end opening of the elongated main housing body. A second end cap sealing the second end opening of the main housing body. An electrical feedthrough extends through a selected one of the first end cap and the main housing body. An electrical conductor extending through the electrical feedthrough for electrical communication with the electrode arrangement. The elongated main housing body and the first and second end caps cooperating to contain a readout gas in communication with the active sheet layer and the electrode arrangement such that, responsive to (i) an electrical bias applied to the electrode arrangement by the electrical conductor and (ii) incident thermal neutrons, an electrical detection current is generated on the electrode arrangement.

BRIEF DESCRIPTION OF THE DRAWINGS

Example embodiments are illustrated in referenced figures of the drawings. It is intended that the embodiments and figures disclosed herein are to be illustrative rather than limiting.

FIG. 17 is a diagrammatic partially cutaway illustration, in an elevational end view, of another embodiment of a thermal neutron detector produced in accordance with the present disclosure.

FIG. 18-23 are diagrammatic partially cutaway illustrations, in elevational end views, of other embodiments of a thermal neutron detector produced in accordance with the present disclosure.

FIG. 24a is diagrammatic partially exploded view, in perspective, of a slidably installable thermal neutron detector module adjacent to a narrow housing, both of which are produced in accordance with the present disclosure.

FIG. 24b is a diagrammatic partially cutaway end view, in elevation, of the thermal neutron detector of FIG. 24a.

FIG. 24c is a diagrammatic partially cutaway side view, in elevation showing a thermal neutron detector module slidingly installed in an elongated housing, in accordance with the present disclosure.

FIG. 25b is a partially cutaway diagrammatic side view, in elevation, of the thermal neutron detector of FIG. 25a.

FIG. 26b is a partially cutaway diagrammatic side view, in elevation, illustrating details of the thermal neutron detector of FIG. 26a.

FIG. 27b is a partially cutaway side view, in elevation, of the narrow thermal neutron detector of FIG. 27a.

DETAILED DESCRIPTION

Figure 1:
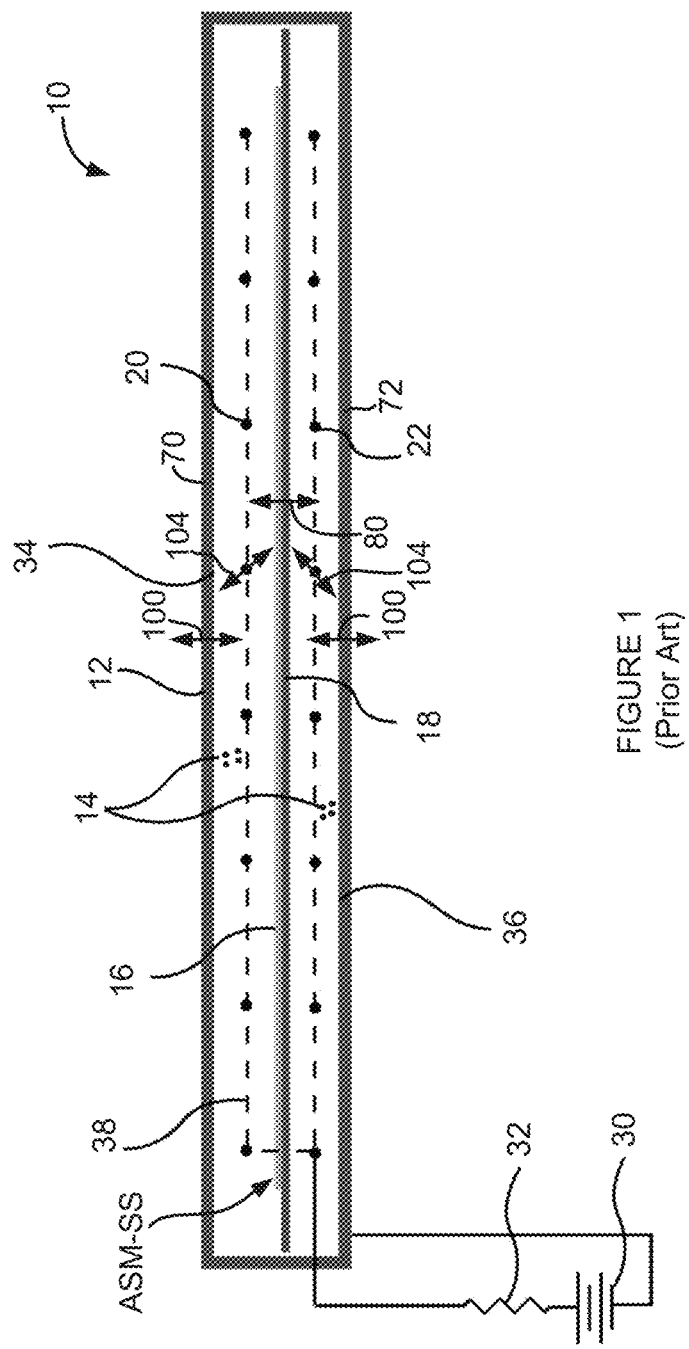
FIG. 1 is a diagrammatic illustration, in elevation, of a prior art thermal neutron detector.

The following description is presented to enable one of ordinary skill in the art to make and use the invention and is provided in the context of a patent application and its requirements. Various modifications to the described embodiments will be readily apparent to those skilled in the art and the generic principles taught herein can be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, top/bottom, left/right and length/width/height can be used with respect to these descriptions, however, this terminology has been adopted with the intent of facilitating the reader's understanding and is not intended as being limiting. The thermal neutron detectors introduced herein are operable irrespective of physical orientation.

Referring again to FIG. 1, Applicants recognize that deflections of chamber 12 upper 70 and lower 72 major walls, in the view of the figure either inward or outward, indicated by double-headed arrows 100, can result from external pressure changes responsive to changing altitude, barometric pressure, and/or temperature in the ambient environment around the hermetically sealed detector. The deflections of the upper and lower major walls of the chamber create deflections of top cathode surface 34 and bottom cathode surface 36, which can change the electric field in the readout gas as a result of changing the distance between the cathode surfaces and the electrodes. In this regard, the prior art approach of FIG. 1 generally uses interior surfaces of the main housing of the thermal neutron detector to serve as the top and bottom cathode surfaces. Given that the active sheet layer is intended to be planar at least to within some manufacturing tolerance, Applicants further recognize that deviation of the ASM-SS and its active sheet material layer from a certain flatness (i.e., waviness) is similar to a deflection in the top and bottom cathode surfaces in terms of how that deviation can change the distance to the electrodes and resultant electric field 40 (FIG. 2). When the electric field changes responsive to such a deflection or waviness in the ASM-SS or responsive to deflection of the top and/or bottom cathode surfaces, the amount of gas gain that occurs in the Townsend avalanche region changes. As will be further described, for every 1% change in the distance between the electrodes and the top or bottom cathode surface, or between these electrodes and the ASM-SS, there can be a 2.7% change in the gas gain.

Figure 2:
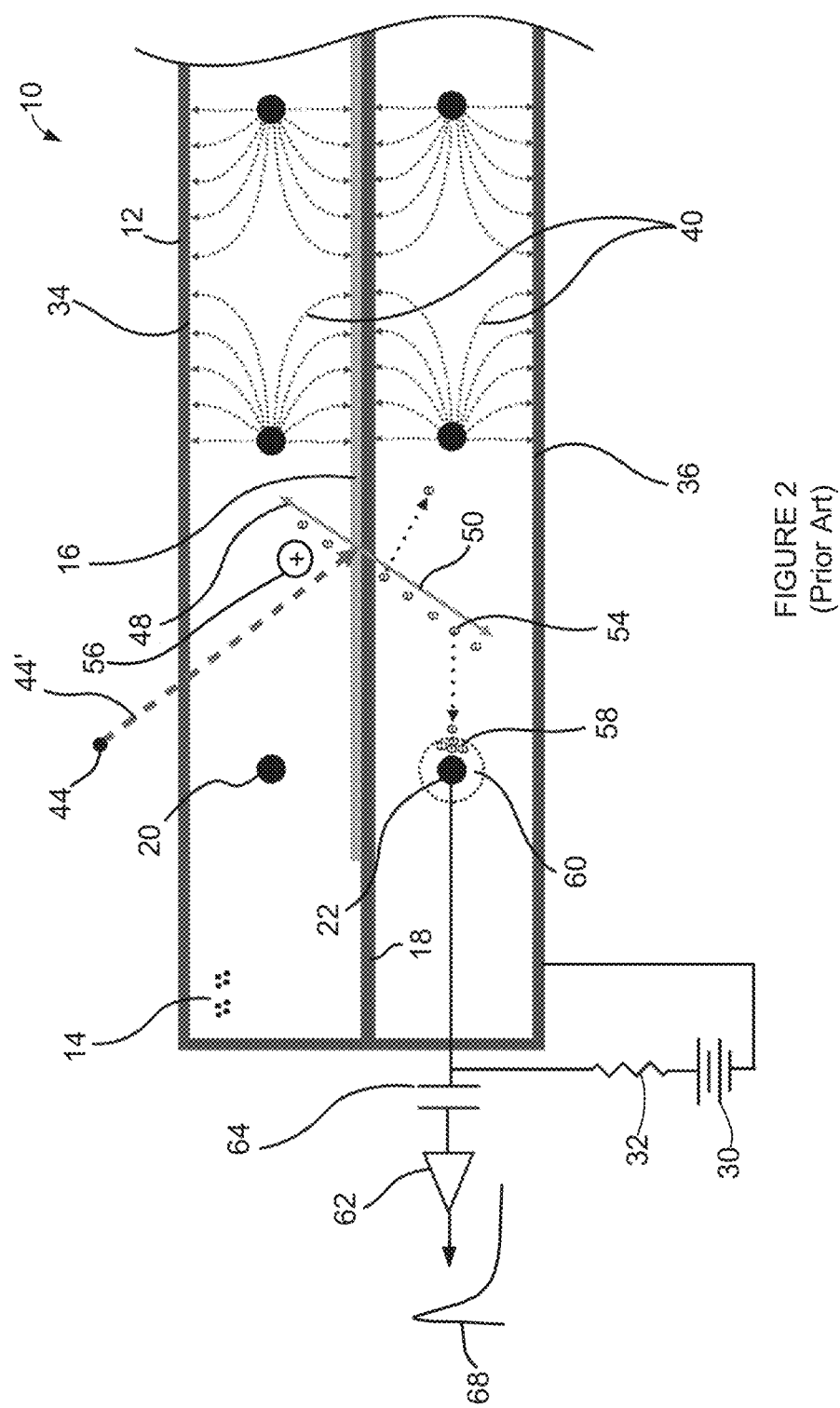
FIG. 2 is a further enlarged fragmentary view of the prior art thermal neutron detector of FIG. 1, shown here to illustrate details of its structure and operation.
Figure 3:
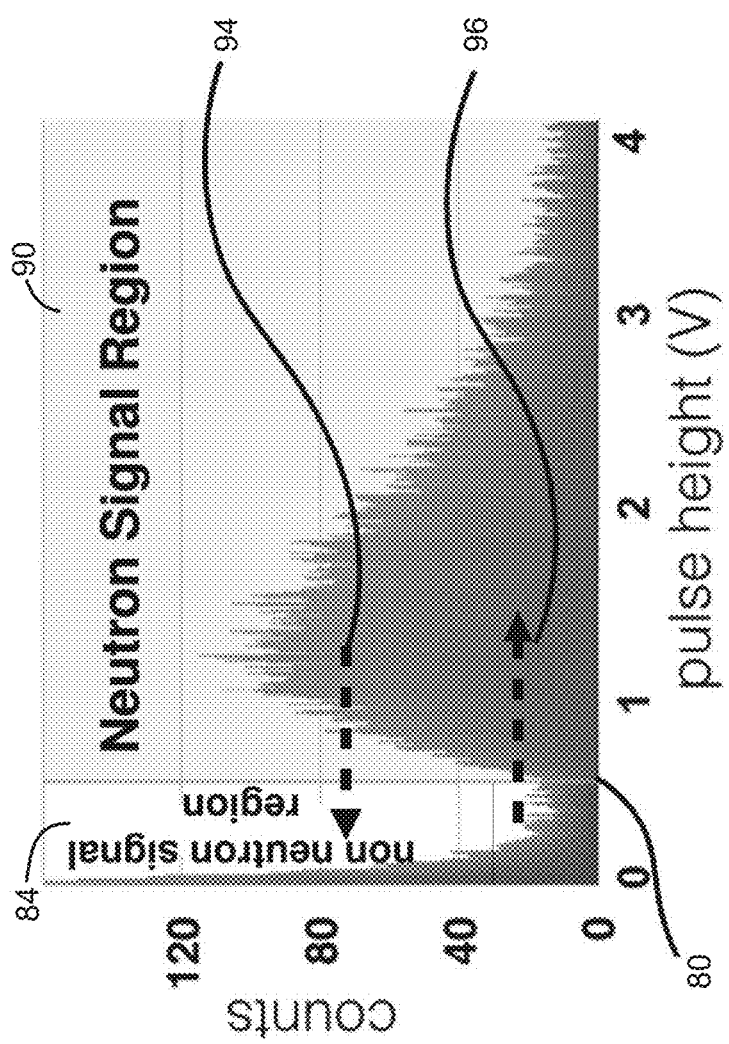
FIG. 3 is a plot of counts on a vertical axis versus pulse height voltage on a horizontal axis and showing Applicant's recognitions with regard to a distribution of pulse heights responsive to thermal neutron detection.

The reader's attention is now directed to FIG. 3 in conjunction with FIG. 1. The former is a plot of counts on a vertical axis versus pulse height voltage on a horizontal axis. By way of clarification, counts are a dimensionless quantity that specifies the number of thermal neutrons detected or counted in a given period of time. A fixed neutron cutoff voltage 80 is illustrated, by way of non-limiting example, at approximately 0.6 volts, serving as a threshold for distinguishing between thermal neutron detection events, above the threshold, and non-neutron detection events below the threshold, such as gamma ray pile-up events. A non-neutron detection region 84 is shown below neutron cutoff voltage 80 while a thermal neutron signal region 90 is shown above the thermal neutron cutoff voltage. For such a fixed neutron cutoff, a change in gas gain can cause some thermal neutrons, that would have otherwise been counted as thermal neutrons, not be counted, as indicated by an arrow 94, reducing the efficiency of the detector. It can also cause noise signals, that would otherwise have been ignored, to be counted as thermal neutrons, as indicated by an arrow 96. Each additional erroneous event that is mistaken as a neutron is problematic by adding to the background signal above which an actual neutron signal must rise to be correctly counted. Therefore, Applicants recognize that these erroneous events can adversely influence the detection efficiency of the thermal neutron detector.

Applicants have determined, based on empirical results, that a 5% loss, at least to an approximation, of detected thermal neutrons will result responsive to an outward deflection of 0.5 mm for a thermal neutron detector design in which the distance between the ASM-SS and the cathode surface is approximately 10 mm. Therefore, if the distance between the ASM-SS and the cathode surface changes to 10.5 mm, for example, responsive to a decrease in ambient pressure, the reduction of gas gain in that area of the readout gas will shift 5% of the thermal neutrons that would originally be detected above neutron cutoff 80 to below the neutron cutoff, and those thermal neutrons will not be detected. Furthermore, Applicants have determined, based on empirical results, that an undesired order of magnitude increase in pulses that are not created by thermal neutrons, but rather from gamma ray induced movements of charge in the detector, will result responsive to a deflection of 0.5 mm inward (i.e., responsive to an increase in ambient pressure), for a thermal neutron detector design in which the distance between the ASM-SS and the cathode surface is approximately 10 mm. Stated in another way, if the gamma ray rejection ratio of the thermal neutron detector (i.e., percentage of gamma ray induced events that pass above cut off voltage 80 to those that are measured below cut off voltage of 80) is $10^{-8}$ and the distance between the ASM-SS and the cathode surface changes to 9.5 mm, by way of example, the gamma ray rejection ratio can increase to $10^{-7}$. Applicants recognize that it is therefore valuable to limit deflections or deformations of the top and bottom cathode surfaces. In an embodiment, the deflection can be less than 0.5 mm responsive to a change in ambient pressure of approximately ½ atmosphere.

Referring again to FIG. 1, Applicants further recognize that mechanical shock and vibrations of ASM-SS, the top and/or bottom cathode surfaces (in the directions indicated by arrows 100), or the electrodes (indicated by arrows 104) on the timescales of microseconds can change the electric field in the readout region in a way that creates pulses that can be difficult to distinguish from neutron pulses. Each additional erroneous event that is mistaken to be a thermal neutron adds to the background signal that must be risen above to measure an actual neutron source near the detector. Moreover, a number of erroneous events in a short period of time when the shock is occurring can be mistaken for many neutrons entering the detector.

Therefore, these erroneous events reduce the effectiveness of the thermal neutron detector due to susceptibility to false alarms. An approximately 0.25 mm movement of the ASM-SS, the top or bottom cathode surfaces, or the electrodes for a chamber where the distance between the ASM-SS and the cathode surface is approximately 10 mm can lead to erroneous pulses. For example, a mechanical shock that creates a movement greater than 0.25 mm can create hundreds of erroneous pulses in one second. This is greater than the number of neutrons that are detected from normal background levels of neutrons, which is approximately 0.1 to 10 counts per second per square meter of detector surface.

Figure 4:
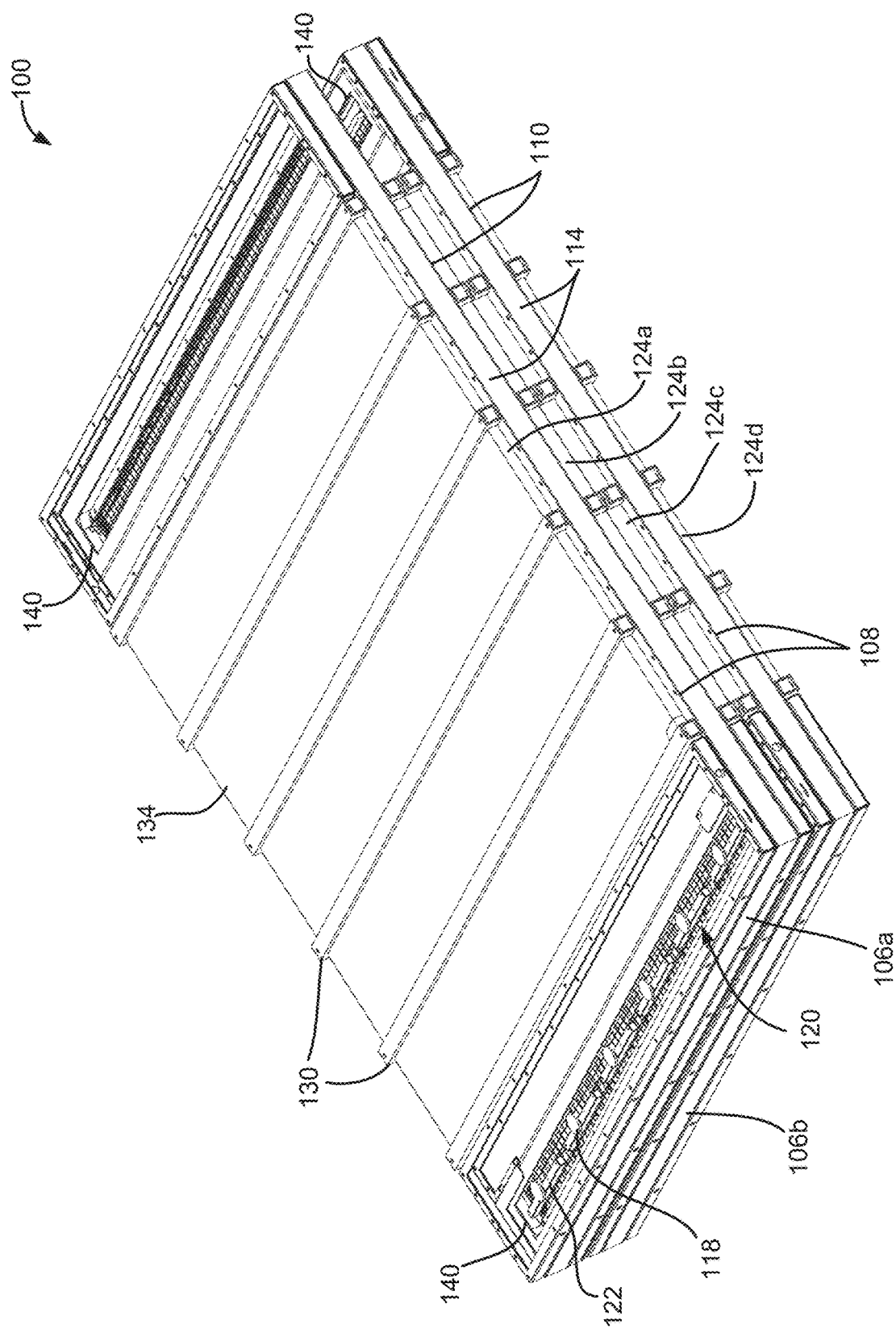
FIG. 4 is a diagrammatic view, in perspective, of an embodiment of a large surface area fissile neutron detector produced in accordance with the present disclosure.

In view of Applicant's recognitions with regard to ambient pressure changes as well as temperature changes, the reader's attention is directed to FIG. 4 which is a diagrammatic view, in perspective, of an embodiment of a large surface area fissile neutron detector, generally indicated by the reference number 100. The latter includes a first thermal neutron detector 106a and a second thermal neutron detector 106b. Thermal neutron detectors 106a and 106b can include a large surface area such as, for example, major opposing surfaces of around 1 m². The thermal neutron detectors include top plates 108 and bottom plates 110, serving as cathodes. The top and bottom plates are spaced apart by sidewalls 114. Electrically conductive bolts 118 serve to couple high voltage to an electrode arrangement 120. Electrode wires are terminated on ganging boards 122 that are in electrical contact with bolts 118. It is noted that covers proximate to the ends of the electrode arrangement have been removed in FIG. 4 to reveal the underlying structure. First and second thermal neutron detectors 106a and 106b are sandwiched between a number of layers of moderator material. These layers are designated by the reference numbers 124a-124d. Each moderator layer will not be described individually, since all of these layers are essentially identical. Each moderator layer can include a plurality of structural ribs 130 that separate strips 134 of moderator material from one another. The moderator material can be any suitable material that serves to slow fissile neutrons to thermal neutrons such as, for example, HDPE (high density polyethylene). Ribs can be formed from suitable materials such as, for example, steel. In the present embodiment, ribs 130 are tubular and can be rectangular or square in cross-section, although any suitable shape can be used. The structural ribs can be fixedly attached to the top and bottom plates of the thermal neutron detectors in any suitable manner such as, for example, by bonding to provide for structural rigidity against deflections due to external pressure changes resulting from changing altitude, barometric pressure and temperature as well as mechanical shock and vibration. Openings 140 are formed in top plates 108 and bottom plates 110 for access to electrode arrangement 120. It is noted that the openings in the bottom layers are not visible in the view of FIG. 4. In the embodiment shown, ribs 130 are parallel. In other embodiments, the ribs for at least one moderator layer can run normal to the direction shown (e.g., lengthwise, as opposed to widthwise). In still other embodiments, the ribs can run at a suitable diagonal angle between the lengthwise or widthwise edges. In some embodiments, some moderator layers include ribs while others do not. In further embodiments, rather than or in addition to the structural ribs, sheets of material such as, for example, carbon fiber reinforced polymer can be bonded to and span the surfaces of the top plate and/or bottom plate. In embodiments that do not use structural ribs, separate moderator strips 134 can be replaced by a single sheet of moderator material.

Figure 5:
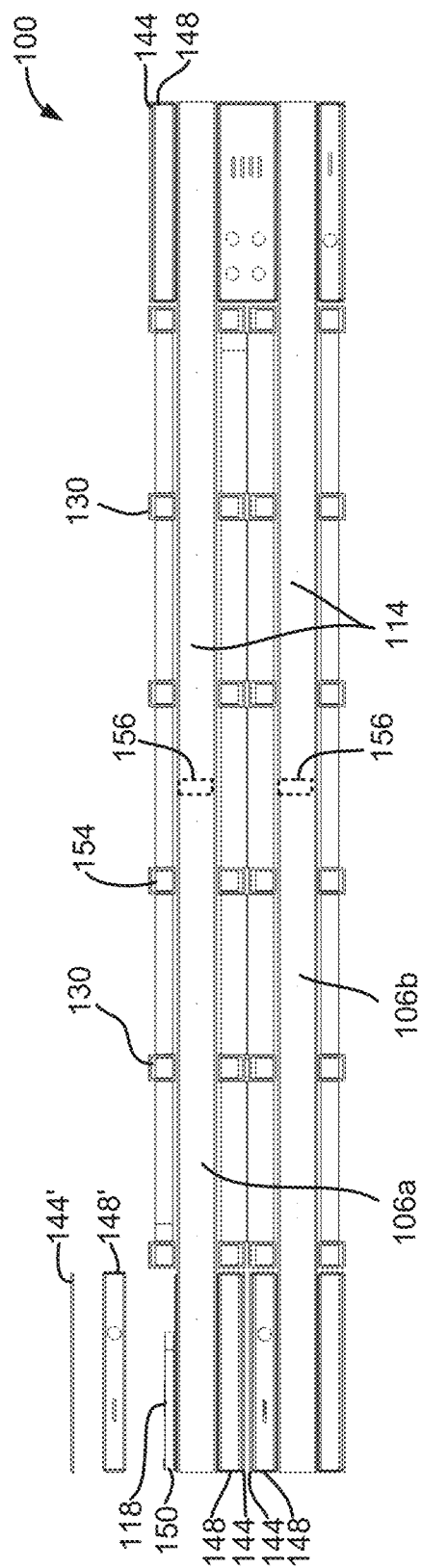
FIG. 5 is a diagrammatic partially exploded view, in elevation, of the embodiment of the large surface area fissile neutron detector of FIG. 4, shown here to illustrate additional details of its structure.

Referring to FIG. 5 in conjunction with FIG. 4, the former is a diagrammatic partially exploded view, in elevation, of fissile neutron detector 100, shown here to illustrate additional details of its structure. In particular, sealing plates 144 and an associated blocking wall 148 can be used to seal openings 140. A particular sealing plate and blocking wall are designated by the reference numbers 144' and 148', respectively, and are shown in a spaced apart relationship with the remaining structure. An insulator 150 formed, for example, from a suitable glass can be used as a layer that supports electrically conductive bolts 118 in openings 140 (FIG. 4) of top plate 108 and bottom plate 110. It is noted that a strip 154 of moderator material can be supported within each rib 130. In some embodiments, structural posts 156 can be utilized, as diagrammatically shown in phantom in FIG. 5 using dashed lines, and can be positioned, as desired, within the thermal neutron detectors to maintain the spaced apart relationship between electrode plates.

While Applicants recognize that structural members such as, for example, structural ribs and posts can be useful in the context of large surface area thermal neutron detectors for purposes of reducing deflections of chamber cathode surfaces to mitigate the effects of pressure and temperature changes, as well as mechanical shock and vibration, Applicants also recognize that the presence of ribs or other such reinforcements such as, for example, posts 156 can increase manufacturing costs while also reducing the active detection area of the large surface thermal neutron detector. Applicants further recognize that large surface area thermal neutron detectors introduce concerns with respect to maintaining the flatness of the ASM-SS assembly and its active sheet material layer. Accordingly, Applicants bring to light still further advances immediately hereinafter with respect to thermal neutron detectors.

Figure 6:
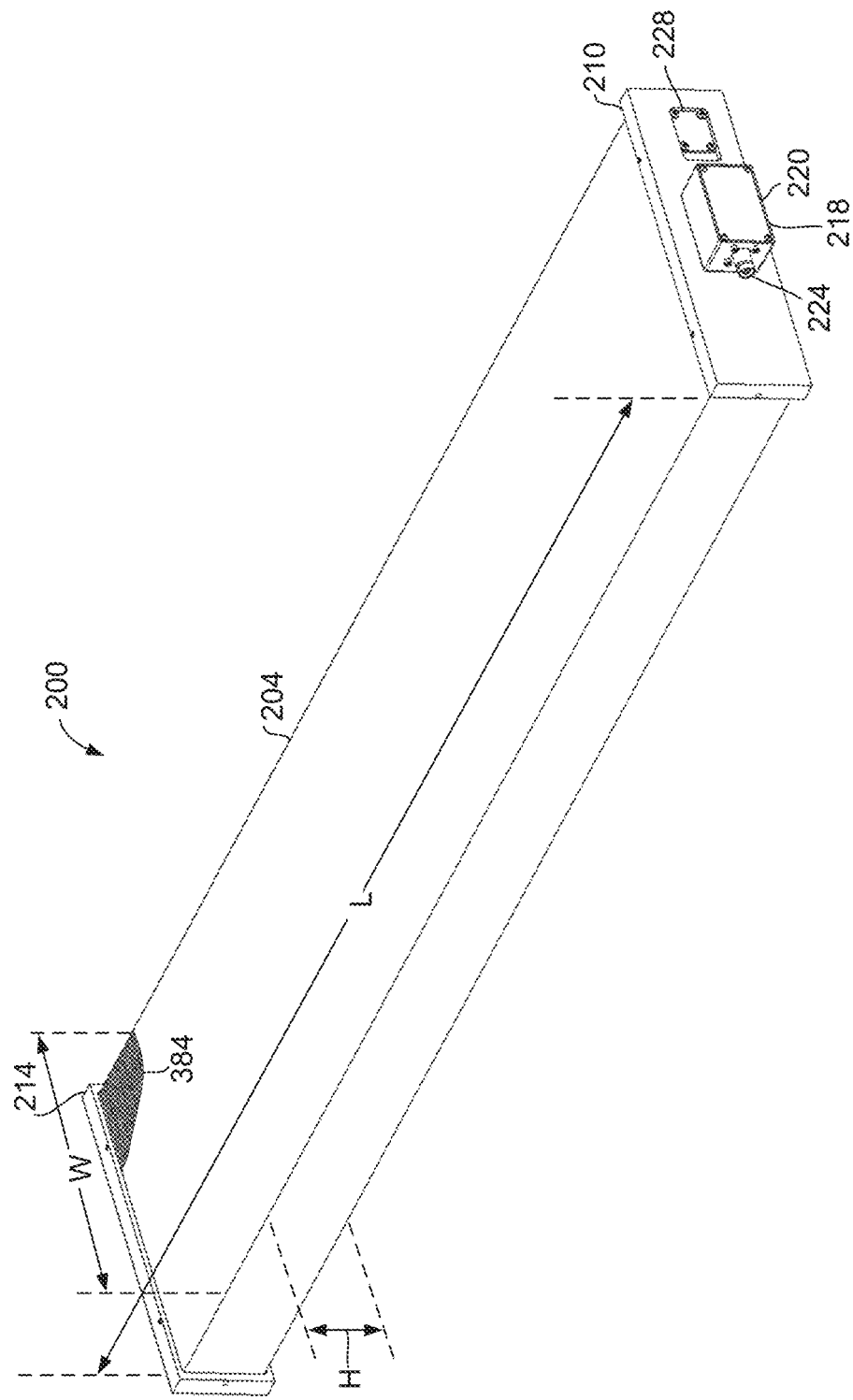
FIG. 6 is a diagrammatic illustration, in perspective, of an embodiment of a narrow thermal neutron detector produced in accordance with the present disclosure.

Attention is now directed to FIG. 6 which is a diagrammatic illustration, in perspective, of an embodiment of a thermal neutron detector produced in accordance with the present disclosure and generally indicated by the reference number 200. As will be seen, in order to address deflection tolerances resulting from external pressure changes due to changing altitude, barometric pressure, and/or temperature, thermal neutron detector 200 is long and narrow (i.e., elongated). Narrow thermal neutron detector 200, however, includes still further design advancements which allow for an additional reduction in the thickness of at least the major walls that define the housing among other advances, as will be discussed at an appropriate point hereinafter.

Still referring to FIG. 6, narrow thermal neutron detector 200 includes a main housing body 204 having a width, W, that is shorter than a length, L. A height or thickness, H, of the main housing body is less than width W. A first end plate 210 and a second end plate 214 sealingly engage main housing body 204 for purposes of hermetically sealing an interior cavity of the narrow thermal neutron detector. The main housing body can cooperate with the end plates to provide a hermetic barrier so that there is less than 1% loss of the readout gas and less than 1% ingress of atmospheric gases such as nitrogen, oxygen, and water vapor into the readout gas over an approximately 30 year period. In the present embodiment, the main housing body can, in whole or in part, be cast, extruded or similarly formed as a single, integral component. In other embodiments, the main housing body and end plates can be cast, extruded or similarly formed as a single, integral component. For example, second end plate 214 can be integrally formed with main housing body 204, thereby limiting the number of joints that require sealing. In some embodiments, at least second end plate 214 can be separately formed and then welded to main housing body 204. In this instance, seam welding can be used. Thermal neutron detector 200 further includes an electrical feedthrough 218 that is made up of an electrical junction box 220 supported by first end plate 210 with an electrical connector 224 for external electrical communication. The electrical connector can be of any suitable type such as, for example, MHV (Miniature High Voltage), SHV (Safe High Voltage) and high voltage type N connectors. A fill port 228 is also provided, as will be further described at an appropriate point hereinafter. It is noted that, in some embodiments, electrical feedthrough 218 can comprise electrical connector 224 having a body that is suitably hermetically sealed to first end plate 210.

Figure 7:
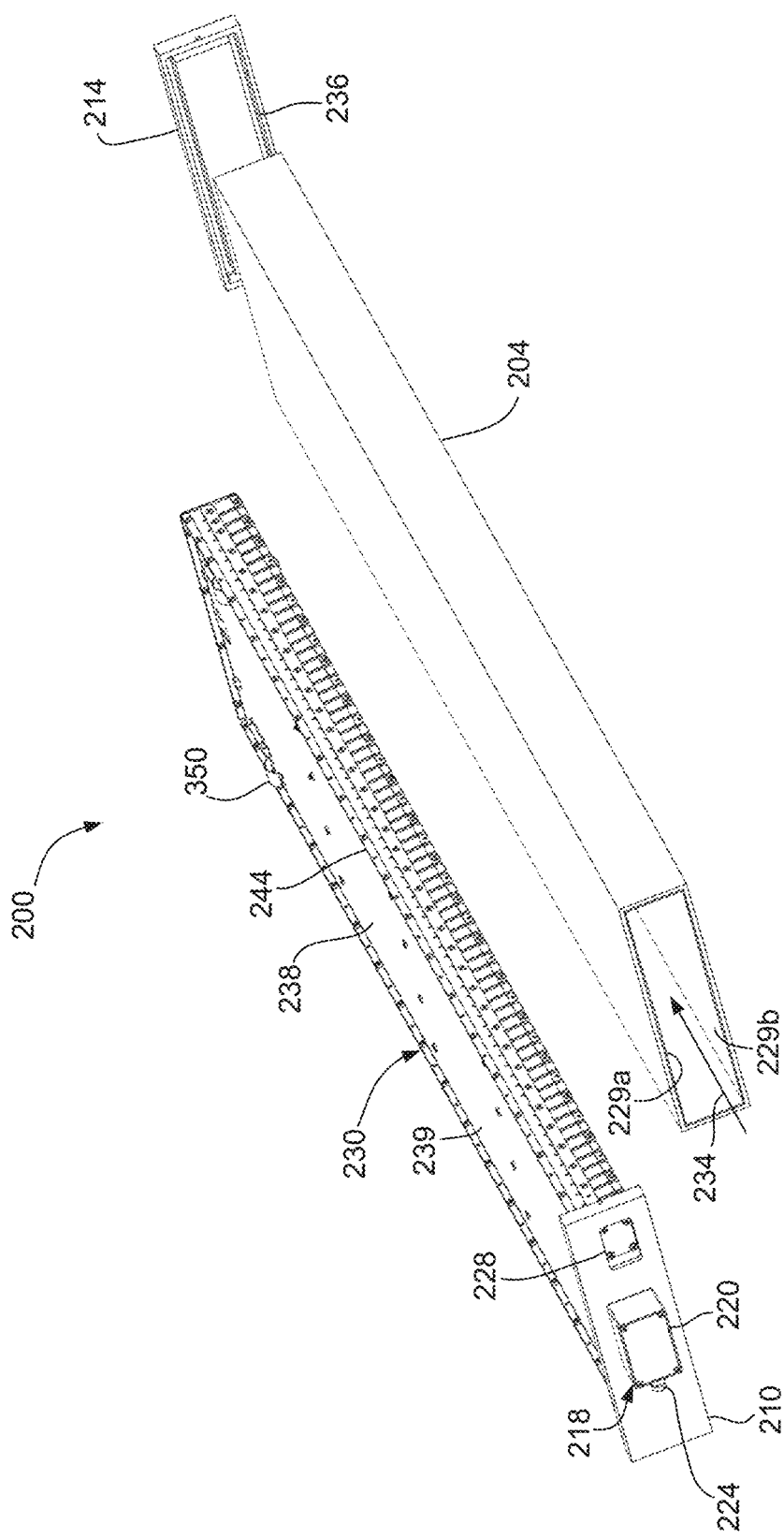
FIG. 7 is a partially exploded view of the narrow thermal neutron detector of FIG. 6, shown here to illustrate additional details of its structure.

FIG. 7 is a partially exploded view, in perspective, of narrow thermal neutron detector 200 of FIG. 6, shown here to illustrate additional details of its structure. The main housing body of the present embodiment is orthorectangular in its peripheral outline including a tube-like elongated form defining opposing first and second end openings and including upper major surface extents 229a and opposing lower major surface extents 229b within the cavity of the main housing body. Main housing body 204 defines an interior cavity that is configured to receive an embodiment of a modular assembly or ionization detector module 230 that is slidingly receivable in the housing in a direction 234 that is indicated by an arrow. It is noted that this modular unit may be referred to interchangeably as a thermal neutron detector module or insert. It is noted that all of the thermal neutron detectors/inserts brought to light by the present Application operate on the principle of ionization. An upper ground plate 238 and a lower ground plate provide structure for module 230 as well as top and bottom cathode surfaces. It is noted that only the upper ground plate is visible in the view of FIG. 7. The upper ground plate and the lower ground plate form upper and lower major surface extents of ionization detector module 230 with the upper major surfaces extents indicated by the reference number 239. The detector module can include a peripheral outline that is complementary to the shape of the main housing body within its cavity with the detector module received at an installed position. In one embodiment, first and second end plates 210 and 214 define a sealing groove 236 that can be rectangular in cross-section for sealingly attaching the end plates to main housing body 204 using a suitable sealant such as, for example, polyisobutylene. The latter provides for post-manufacture reopening of the thermal neutron detector for repair and/or component replacement. Each end of the main housing body can be received in the sealing groove of an associated end plate such that the end plate is at least approximately centered within the groove and separated from the end plate on all three sides that confront the surfaces of the rectangular sealing groove with the groove filled by sealant. In this way, there is no direct physical contact between the end plates and the main housing body. This design allows for the seal between each end plate and the main housing body to accommodate tolerance variations at least of the housing, providing for the use, for example, of low cost aluminum extrusions for the housing. Such aluminum extrusions can have significantly larger tolerances (50 to 100 thousandths of inches) in their dimensions as compared to a machined or sheet metal part (5 to 10 thousandths of inches). This allows for a low tolerance, lower cost, and commercially available housing to be used while still limiting the unwanted permeation of the readout gas out of the chamber or unwanted permeation of the atmospheric gases into the chamber. It is noted that the main housing body can be formed from any suitable material or combination of materials either currently available or yet to be developed while remaining within the scope of the teachings herein. By way of example, an outer shell of carbon fiber material can include an inner stainless steel layer. The teachings herein can also be applied using end caps of other configurations. In one embodiment, the end plate or cap can include a wedge shape capturing a sealant material between the wedge-shape and the interior surfaces of the main housing body. Feedthrough 218 provides electrical feedthrough to the internals of the chamber for externally communicating a detection signal and for receiving a high voltage (HV) bias, as will be further described.

Figure 8:
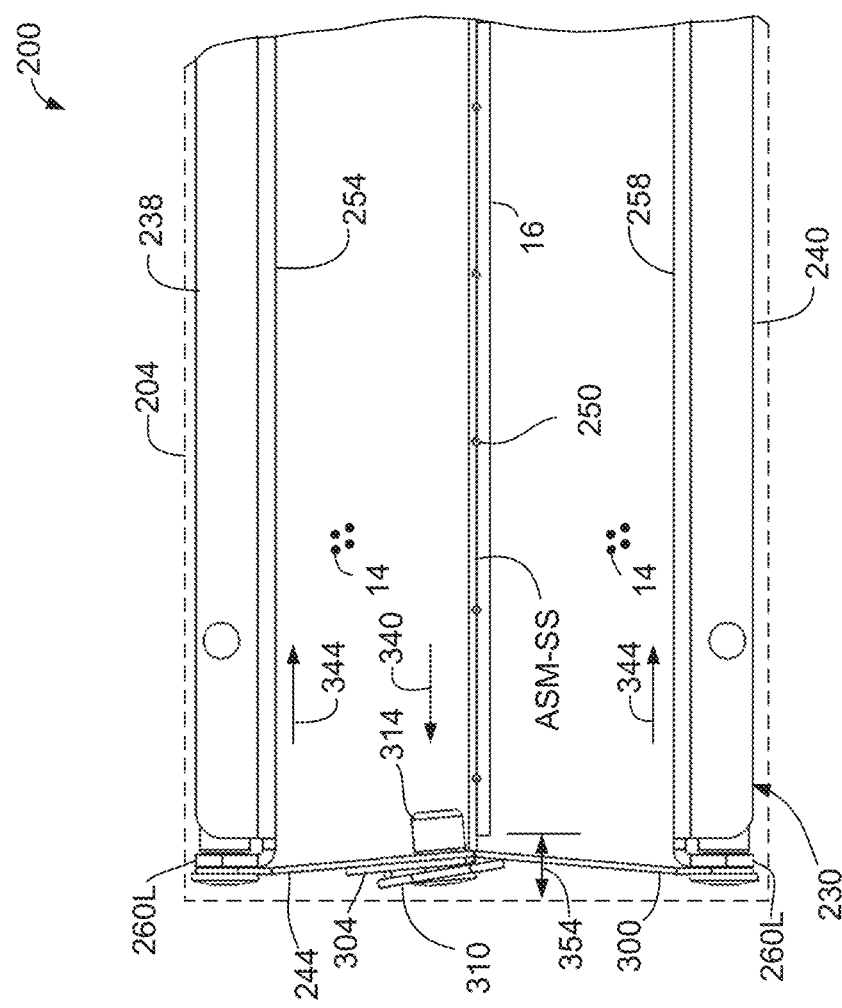
FIG. 8 is a further enlarged fragmentary view, in elevation, taken from one end of an elongated detector module of FIG. 7.

Referring to FIG. 8 in conjunction with FIG. 7, the former is a further enlarged fragmentary view, in elevation, taken from one end of elongated thermal neutron detector module 230 showing upper ground plate 238 and a lower ground plate 240. It is noted that electrodes have not been shown in FIG. 8 for purposes of illustrative clarity, but are understood to be present. Main body housing 204 is shown in phantom using dashed lines to illustrate the relationship between the main housing body and the thermal neutron detector module with the latter received in an installed position. The ground plates are supported in a spaced apart orientation by a sidewall 244. In the present embodiment, the opposing sidewall can be identical, although this is not a requirement in other embodiments yet to be described. The ASM-SS can include a support structure or framework 250 such as, for example, a wire mesh for supporting active sheet material layer 16 such as, for example, Li-6 metal. It is noted that the active sheet material laterally spans or covers at least a majority of the length and width of detector module 230 as well as the length and width of thermal neutron detector 200. Other embodiments of framework 250 can include any suitable structure such as, for example, a honeycomb matrix, a wire mesh, sheet metal where holes or apertures are cut out of the sheet metal or some suitable combination of differing structures. An inside surface of upper ground plate 238 presents an upper or top cathode 254 to the interior of the detector module while an inside surface of lower ground plate 240 presents a lower or bottom cathode 258 to the interior of the detector module. When detector module 230 is hermetically sealed into the overall housing of the thermal neutron detector, readout gas 14 is installed within the interior cavity of the overall housing through fill port 228.

Figure 9:
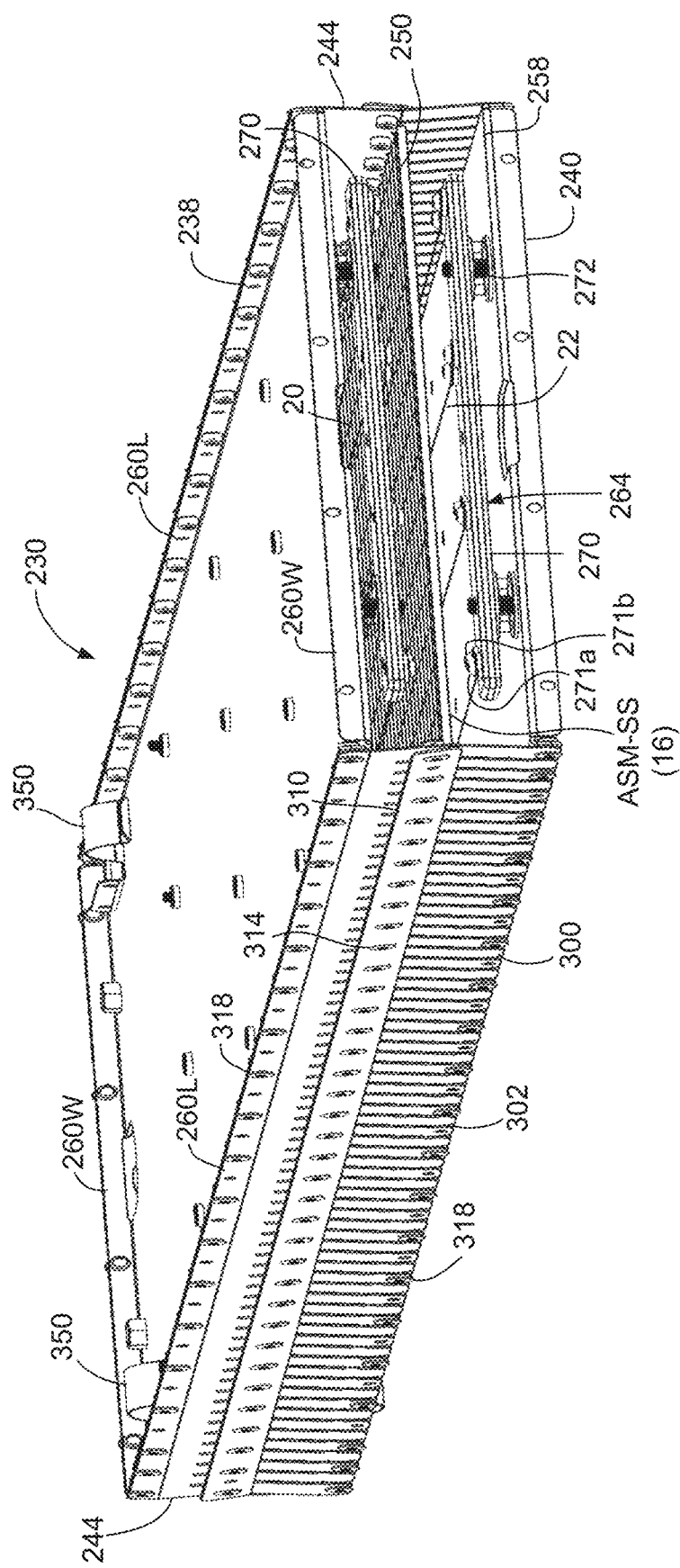
FIG. 9 is a diagrammatic view, in perspective, of the embodiment of a thermal neutron detector module shown in FIGS. 7 and 8.
Figure 10:
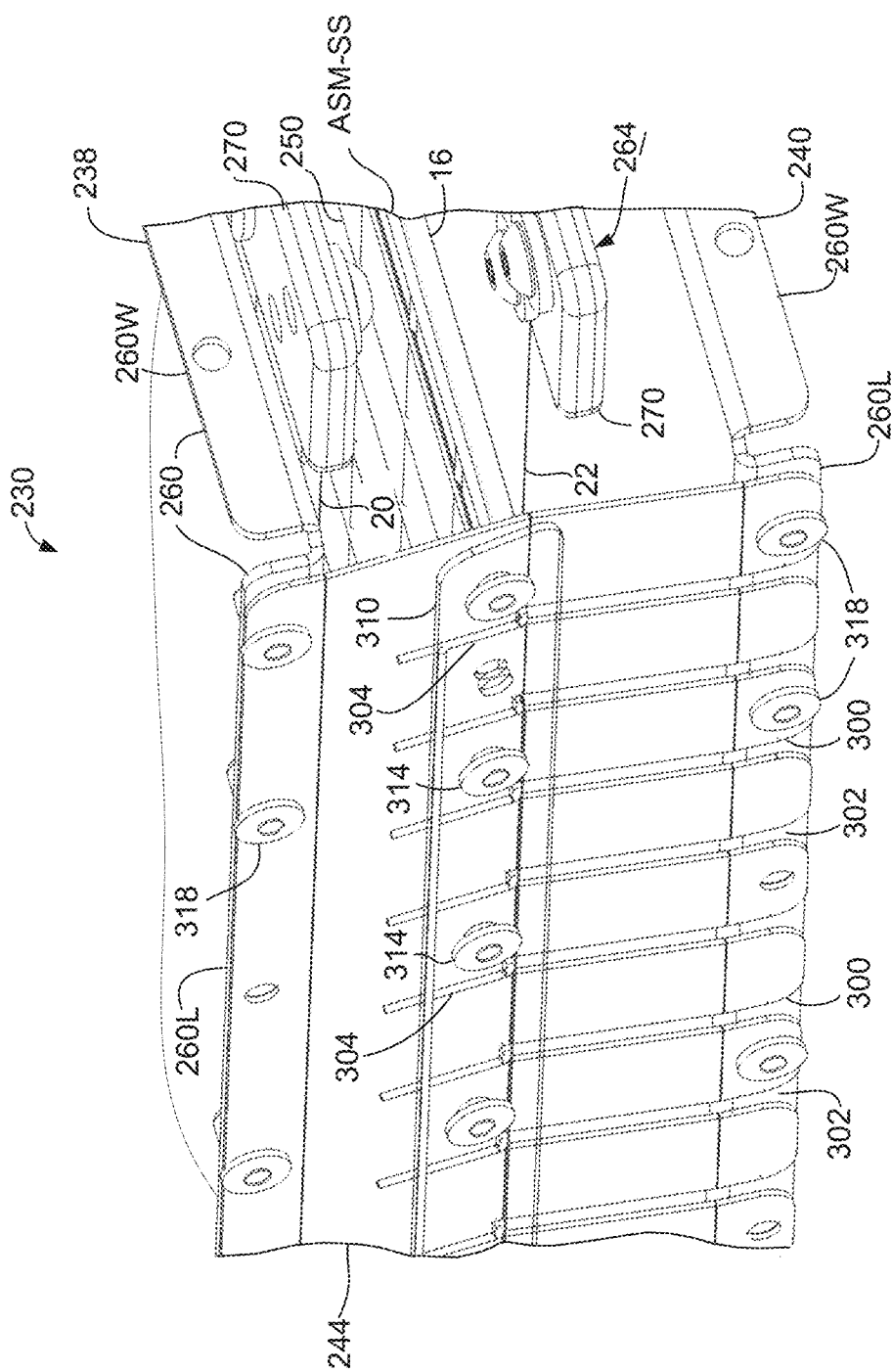
FIG. 10 is a further enlarged fragmentary view, in elevation, showing one corner of the thermal neutron detector module of FIG. 9 to illustrate additional details of its structure.

FIG. 9 is a diagrammatic view, in perspective of embodiment 230 of the thermal detector module while FIG. 10 is a further enlarged fragmentary view, in elevation, showing one corner of the embodiment to illustrate details of its structure. As seen in FIGS. 8-10, the opposing lengthwise and widthwise peripheral edges of upper ground plate 238 and lower ground plate 240 can each include tabs 260 that project at least generally orthogonal to the major extents of the ground plates. These tabs define the edges of the upper and lower ground plates and may be referred to collectively using the reference number 260. In some instances, the lengthwise tabs may be referred to by the reference number 260L while the widthwise tabs may be referred to by the reference number 260W. In the present embodiment, the tabs are formed by bending with corner regions cut out such that the tabs are integral to each ground plate, although this configuration is not a requirement. Thus, each electrode or ground plate of the present embodiment includes a pair of lengthwise tabs 260L and a pair of widthwise tabs 260W that define lengthwise and widthwise side margins of the detector module. Accordingly, there is a first pair of lengthwise edges (one lengthwise edge of the upper electrode plate and another lengthwise edge, opposite the ASM-SS from the lower electrode plate) proximate to one side of the elongated main housing body and a second pair of lengthwise edges proximate to an opposite side of the elongated main housing body. As will be seen, side spacers can extend between the lengthwise edges that make up each of these pairs of lengthwise edges. An electrode arrangement 264 includes first set of electrodes 20 above the ASM-SS and second set of electrodes 22 below the ASM-SS such that the first and second sets of electrodes are oppositely proximate to one of a pair of opposing major surfaces of the active sheet layer or material. In the present embodiment, the electrodes comprise electrode wires with the electrode arrangement spanning or covering a majority of the lateral extents (length and width) of detector module 230 as well as the lateral extents of thermal neutron detector 200. In some embodiments, a single electrode wire can be used on one or both of the opposing major sides of the active sheet material with the detector module at an installed position. Ganging boards 270 can clampingly receive the ends of electrode wires that make up the sets of electrodes. In one embodiment, a first conductive screw 271a' can clamp and secure the electrode wire, and a second conductive screw 271b" can cover a sharp end of the electrode wire to reduce the strength of the electric field at the terminated end of the electrode wire, which reduces the ability for discharge. In other embodiments, the electrode wires can be attached to the ganging boards 270 by soldering or by soldering in some combination with screws. Each ganging board is electrically conductive for electrical communication with the electrode wires and can be supported by a nearest one of the ground plates by electrically insulating standoffs 272 which can be formed, for example, from suitable materials such as plastic and/or glass and which secure the electrodes in the proper location in-between the top and bottom cathode surfaces and the ASM-SS. High voltage can be applied to the ganging boards that are proximate feedthrough 218 (FIG. 7). Detection signals can also be externally received from the ganging boards via the feedthrough.

Still referring to FIGS. 8-10, sidewall 244 is formed to include a plurality of fingers 300 which are best seen in FIG. 10. The fingers are spaced apart such that series of gaps 302 between adjacent ones of the fingers match the wire-to-wire spacing of wire mesh 250. The latter is installed with individual widthwise ends 304 of the wire mesh received in the gaps. A clamping bar 310, which has been rendered as transparent in the view of FIG. 10 for purposes of illustrative clarity, clamps ends 304 against sidewall 244 using suitable fasteners 314 such as, for example, blind rivets. Other suitable fasteners 318 such as, for example, blind rivets, are used to attach sidewall 244 to lengthwise tabs 260L of the upper and lower electrode plates. It is noted that fingers 300 and gaps 302 serve as one non-limiting example of structural features for securing mesh 250 for the application of tension.

In an embodiment that uses a honeycomb matrix or sheet metal instead of mesh in the ASM-SS, suitable apertures can be formed to receive the fingers.

Figure 11:
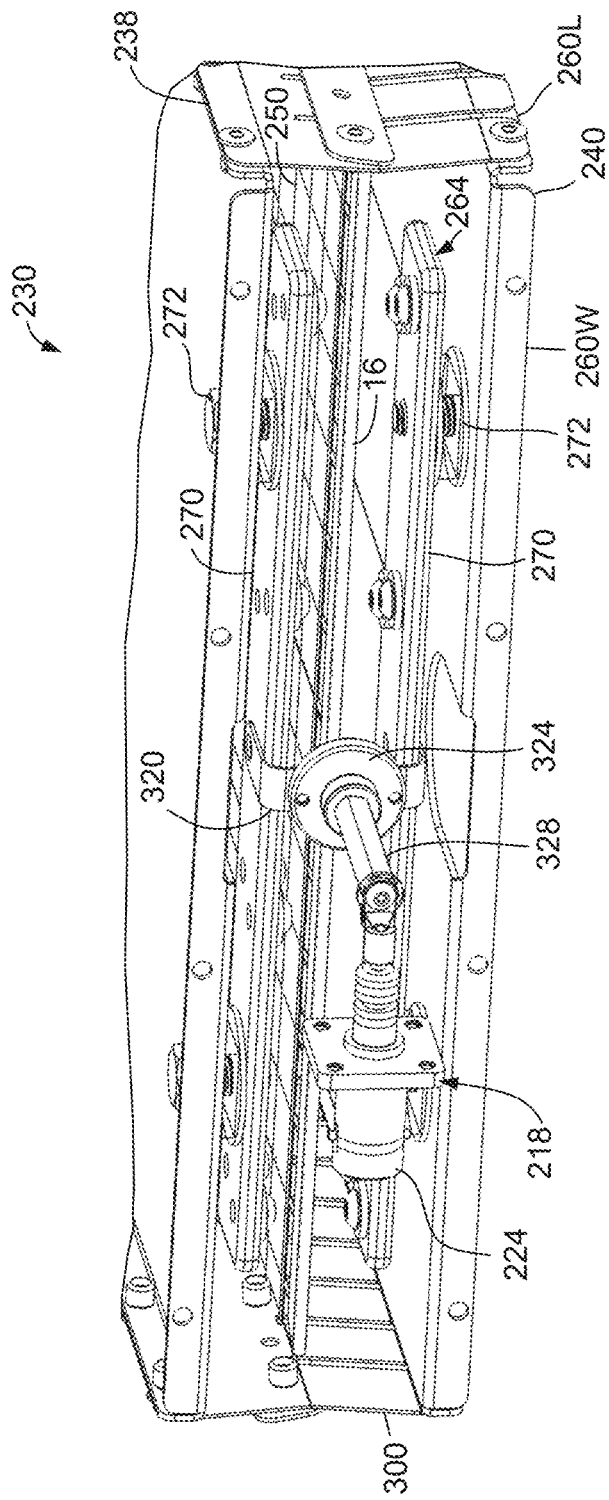
FIG. 11 is a diagrammatic further enlarged fragmentary view, in perspective, illustrating additional details of the electrical connection end of the thermal neutron detector module of FIGS. 9 and 10.

FIG. 11 is a diagrammatic further enlarged fragmentary view, in perspective, illustrating additional details of the electrical connection end of thermal neutron detector 230. It is noted that end plate 210 (FIGS. 6 AND 7) and junction box 228 have not been shown for purposes of illustrative clarity. A ganging board clip 320 electrically couples upper and lower ganging boards 270. An electrically conductive bolt 324 is in electrical communication with the ganging board clip and is sealed in electrical isolation against end plate 210 (FIGS. 6 and 7) such that an electrically conductive pin 328 extends outwardly. The latter is in electrical communication with connector 224 (see also, FIG. 7). Connector 224 is connected to pin 328 subsequent to installation of end plate 210.

Figure 12:
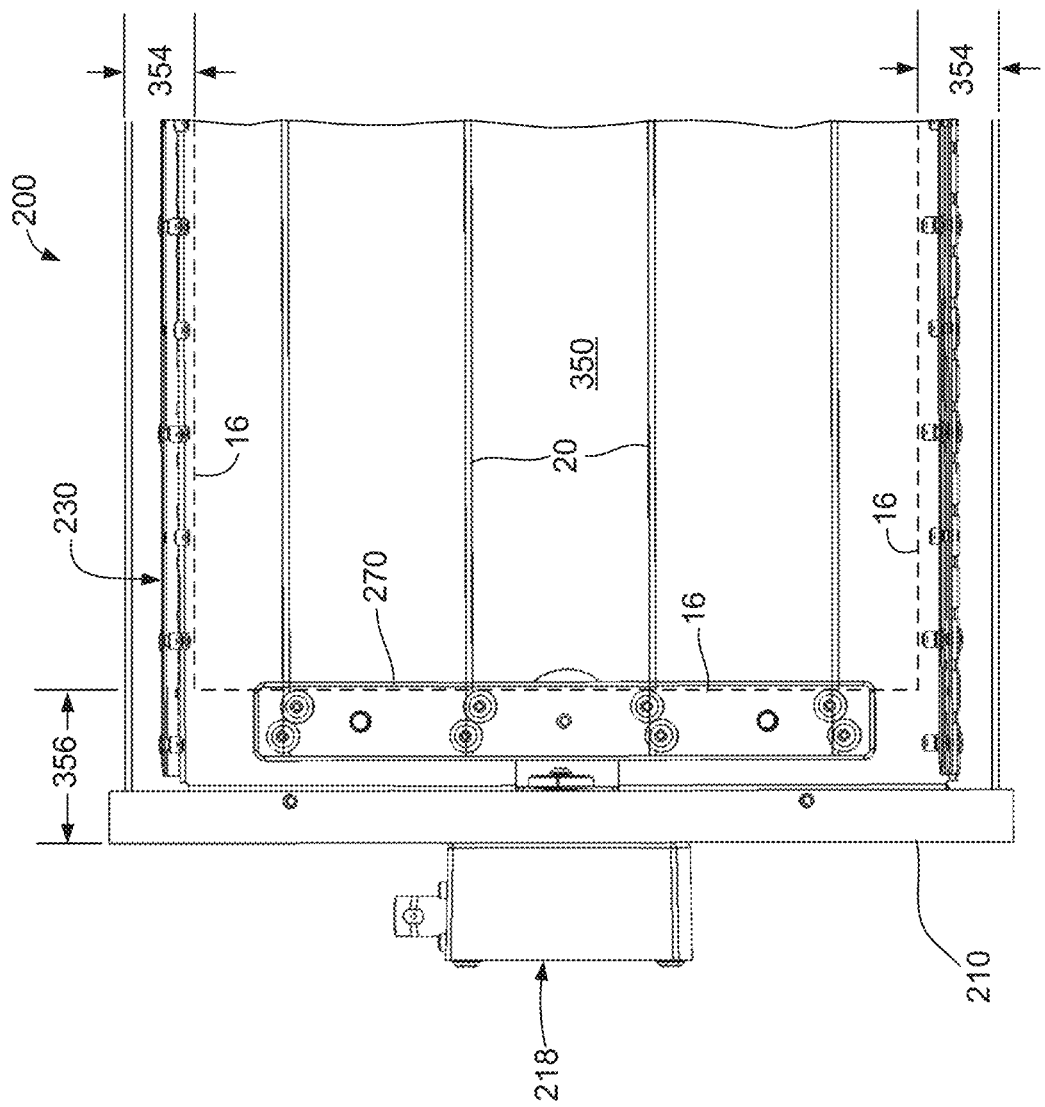
FIG. 12 is a diagrammatic plan view of the thermal neutron detector of FIGS. 6 and 7 that is partially cutaway to show details of its structure.

FIG. 12 is a diagrammatic plan view of thermal neutron detector 200 that is partially cutaway to show details of its structure. In particular, outer edges of active sheet material 16 are indicated using dashed lines. An active region 350 of the thermal neutron detector corresponds to the area of the active sheet material. The area outside of the active region is considered as non-active. Accordingly, FIG. 12 illustrates a relatively narrow width 354 (also seen in FIG. 8) of a non-active region along the lengthwise edges of the detector as compared to a non-active width 356 at the widthwise edges. One goal of maintaining a large active region and minimizing non-active region is attained with this design due to the reduced area needed at the side of the detector body for the thickness of the housing, the side sidewall spacer, and the securing fasteners such as, for example, rivets. The non-active regions at the lengthwise ends are essentially unchanged as compared to a large area thermal detector due to the presence of ganging boards 270. In terms of total area, if the non-active region is 0.5 cm wide on each side of the detector, and 5 cm on each ends of the housing (where the ganging boards and end plates are installed), the dead (i.e., non-active) region is approximately (0.5×2×100+ 7×2×20)/100×20=19% non-active region. It should be noted that this is less than the non-active region of 22% shown for large thermal neutron detector 100 shown in FIGS. 4 and 5 which uses relatively wider sides for structural support. This is because of the relatively narrow active regions on the lengthwise sides of the narrow thermal neutron detector. Based on the foregoing, it should be clear that narrow thermal neutron detectors can be placed side by side (i.e., with lengthwise edges adjacent to one another) to obtain a larger combined active detection area. Such a side-by-side arrangement can provide a non-active region that increases only slightly, percentage wise, above that of the individual narrow thermal neutron detectors as a direct result of the narrow extents of the non-active area along the lengthwise extents of each detector.

Figure 13:
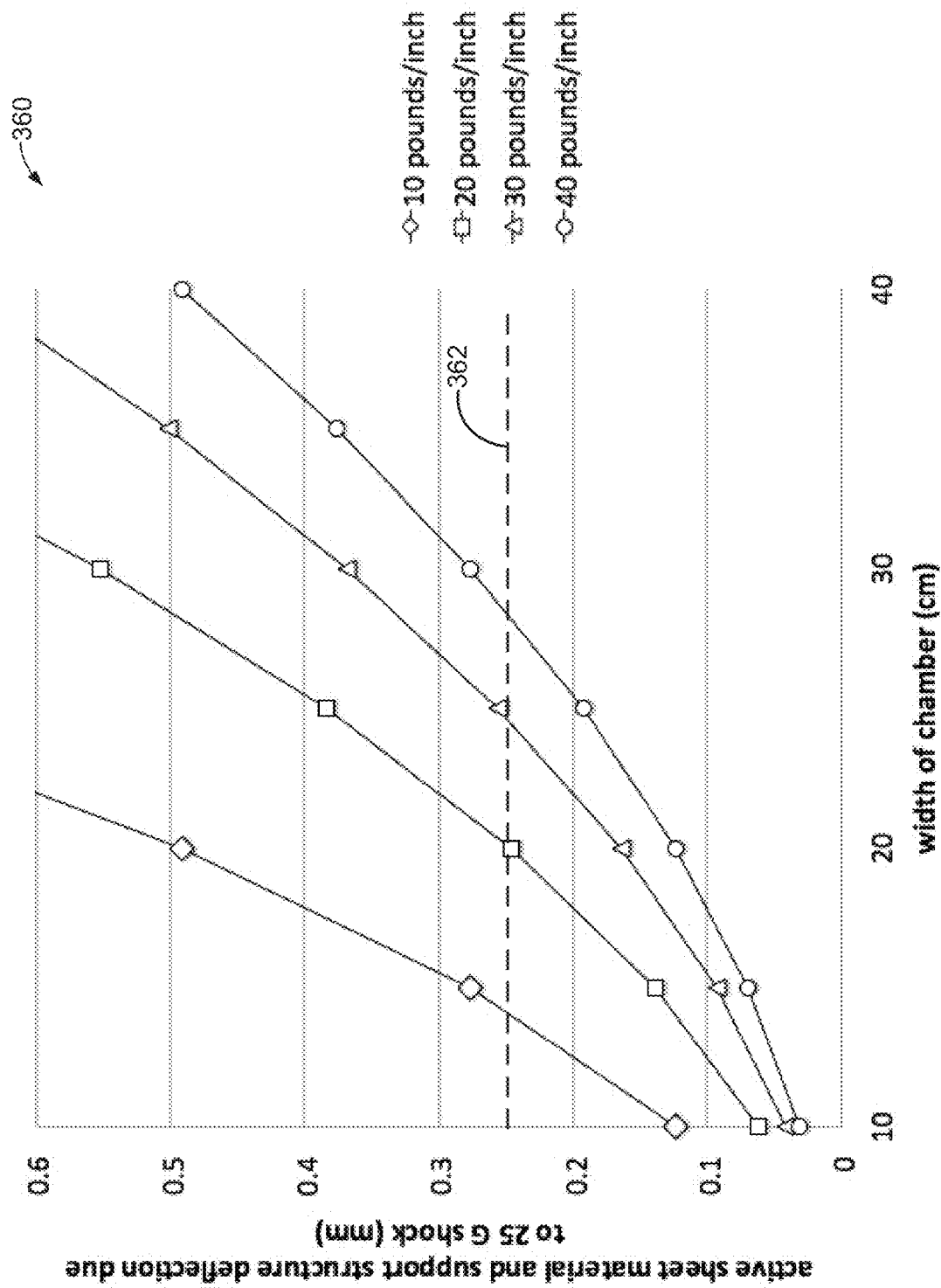
FIG. 13 is a graph plotting deflection of an active sheet material and support structure responsive to a 25 G shock versus chamber width for four different tensions on the support structure and active sheet material.

Having described thermal neutron detector module 230 in detail, it is appropriate at this juncture to discuss functional aspects of its remarkable structure, as well as the ways in which certain limitations of the prior art have been swept aside based on this unique structure. Applicants recognize that it can be very challenging to assemble a thermal neutron detector in such a way that the support structure for the active sheet material is flat to provide a constant gas gain across the chamber of the thermal neutron detector. Applicants further recognize that placing the active sheet material layer under tension provides a degree of resistance to mechanical shock and vibration that provides sweeping benefits as compared to an untensioned active sheet material. FIG. 13 is a graph, generally indicated by the reference number 360, plotting deflection of a given active sheet material and support structure (i.e., the ASM-SS) responsive to a 25 G shock versus chamber width for four different tensions on the support structure and active sheet material, as indicated by a key in the figure. It is thought that a 25 G shock represents a maximal shock that a thermal neutron detector may encounter in operational use. An ASM-SS displacement of 0.25 mm (indicated as a dashed line 362) or less will not significantly affect the neutron signal. With 0.5 mm thick (i.e., diameter), 1 inch spacing mesh wire for the support structure, mesh that receives tension force 340 (FIG. 8) at 10 pounds per lengthwise linear inch will allow a 14 cm wide chamber before reaching the 0.25 mm displacement limit; mesh that is tensioned at 20 pounds per linear inch will allow a 20 cm wide chamber before reaching the 0.25 mm displacement limit; mesh that is tensioned at 30 pounds per linear inch will allow a 25 cm wide chamber before reaching the 0.25 mm displacement limit; and mesh that is tensioned at 40 pounds per linear inch will allow a 28 cm wide chamber before reaching the 0.25 mm displacement limit. Clearly, the application of tension force can dramatically reduce adverse deflection of the ASM-SS responsive to mechanical shock and vibration as compared to arrangements in which the ASM-SS is not under tension. By way of comparison, given the same 20 cm ASM-SS under tension force 340 of at least 20 pounds per linear inch versus one under that is not under tension, the amount of improvement is on the order of at least a factor of 10.

The modular assembly of FIGS. 7-10 provides detector module 230 as a standalone component that creates tension on support structure 250 (i.e., wire mesh in the present embodiment) to reduce the shock and vibration properties of the ASM-SS to below 0.25 mm in order to avoid creating signals responsive to shock and vibration that would erroneously count as neutron signals. With reference to FIGS. 8 and 9, side spacers 244 are flexed inwardly to apply a tension force 340 (indicated by an arrow and produced by the illustrated sidewall in FIG. 8) to the lengthwise edges of the ASM-SS. The tension is applied along or aligned with the width of the main housing body and across the width of the active sheet layer itself. In this design, the tension force is applied responsive to a compression force 344 on lengthwise tabs 260L of the ground plates. Tension force 340 can be applied as a result of resilient or spring-like flexing of sidewalls 244, as can clearly be seen in FIG. 8 wherein the sidewall is inwardly flexed thereby applying a flexural force. Application of tension in this way on the support structure can provide the tension as a resilient biasing force. That is, the sidewall is not permanently deformed but instead would spring back responsive to releasing the tension. The application of tension in any suitable manner is a beneficial aspect of the design for the reduction of the shock and vibration properties of the ASM-SS to below 0.25 mm in order to avoid shock and vibration of the ASM-SS creating erroneous signals that are counted as neutron signals. In other embodiments, tension can be applied by stretching the ASM-SS between essentially rigid, rather than flexural sidewalls. Any manner of applying tension based on the teachings herein is submitted to be within the scope of the present application. It should be appreciated that tabs 260 aid in structural rigidity as well as aid in the assembly process. The tabs not only facilitate securing of the structure to the side spacer, but also widthwise tabs 260W provide for attachment of module 230 to electrical feedthrough endplate 210 (FIG. 7) before sliding the module into main housing body 204. In this regard, spring slides 350 (FIG. 9) facilitate this sliding engagement with a pair of the spring slides attached to each electrode plate. The spring slides further serve to maintain centering of one end of module 230 proximate to end plate 214 with module 230 slidingly received in an installed position within main housing body 204 having the detector module upper major surface extents (239 in FIG. 7) in a confronting relationship with surface 229a (FIG. 7) and the detector module lower major surface extents in a confronting relationship with surface 229b. The spring slides resiliently engage the main body housing, disallowing the modular assembly from side-to-side and up-down movements within the housing. The spring slides also have the benefit of providing for the use of a lower dimensionally toleranced housing, as the spring slides can take up a variable spacing between the extents of the modular assembly and the internal walls of the housing. Attachment of ground plates 238 and 240 to end plate 210 also imparts more structural rigidity to the modular assembly by securing module 230 against shearing forces that would increase or decrease the angles formed between side spacers 244 and the ground plates. It should be appreciated that the application of tension force likewise addresses concerns with respect to waviness in the ASM-SS. In this regard, tension forces sufficient to address mechanical shock will also generally be sufficient to essentially eliminate waviness.

Applicants' approach using a narrow thermal neutron detector design with tensioning of the ASM-SS addresses various challenges of manufacturing. It is very difficult to build a chamber that maintains tension on the structural support for the active sheet material that is not heavy. By taking advantage of the flexural forces of a side spacer that is attached to the ground plates and the support structure, the tensions needed to limit deflections of the support structure for the active sheet material can be realized along the length of the modular assembly with a reduced amount of weight and cost of materials. This is in contrast to the needs of a large thermal neutron detector design, where tension requirements are far higher to achieve comparable results, such that the available amount of tension can be limited by excessive flexing of the sidewall, therefore requiring the use of a heavy and higher cost material for the sidewall in order to withstand the required level of support structure tension. In contrast, side spacers 244 of the present disclosure are configured to actually apply sufficient tension to the narrow active layer support and it is that flexure of the side spacers that generates the tension. Also, the side support(s) or spacer(s) can be configured in any suitable manner for purposes of applying the flexural tension, as will be further described.

Figure 14:
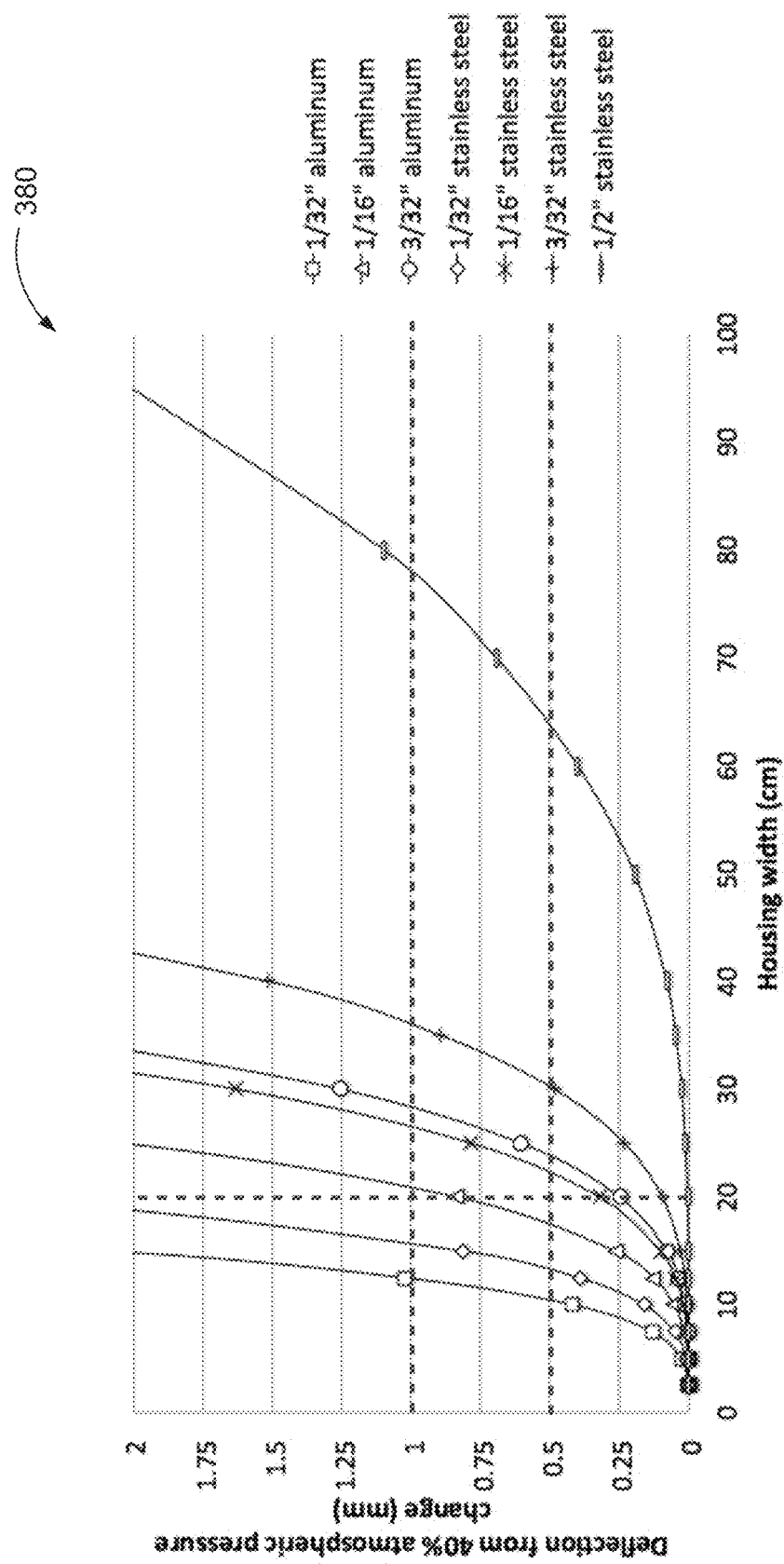
FIG. 14 is a plot which shows deflection at a 40 percent atmospheric pressure change versus housing width for a number of different housing materials and thicknesses.

Now considering aspects of pressure differential, Applicants recognize that the major surfaces or walls of a narrow housing (i.e., formed by upper and lower walls/surfaces of main housing body 204 in the views of FIGS. 6 and 7) generally deflect less responsive to pressure differential than a relatively wider chamber wall or surface such as, for example, a square major wall in a large area thermal neutron detector, given the use of the same material (thickness and composition) for forming the housing. FIG. 14 is a plot, generally indicated by the reference number 380, which shows deflection at a 40 percent atmospheric pressure change versus housing width for a number of different housing materials and thicknesses. Applicants note that the thickness that would be required for the top or bottom plate/surface, in order to stay within 0.5 mm deflection for an approximately 60 cm wide chamber, is 12.7 mm of stainless steel. Such a large thermal neutron detector would weigh over 1000 pounds and the weight and cost of the detector would not be practical to manufacture, sell, ship, or use. The plots demonstrate, however, that as the chamber is reduced in width to 20 cm, a 1/16" thick stainless steel (i.e., standard 304 SS), 3/32" aluminum (i.e., standard 6063 aluminum), and 3/32" stainless steel top or bottom major surface all exhibit less than the limit of 0.5 mm deflection, and the cost and weight of the materials render the resulting narrow thermal neutron detector practical to manufacture, sell, ship, and use.

Referring to FIG. 6, in an embodiment, a sheet of material 384 is partially shown on the major wall/surface of main housing body 204. Material 384 can comprise, for example, carbon fiber reinforced polymer. This layer can be adhered/bonded to span the top and/or bottom major surfaces of the main housing body to further reduce deflection of these major walls responsive, for example, to ambient pressure changes as well as mechanical shock and vibration. In this regard, Applicants recognize that a composite structure such as, for example, metal/epoxy/carbon fiber reinforced polymer can be used to make up at least major walls of the main body housing.

As a further investigation with regard to pressure-related housing deflection, Applicants performed a simulation of a 3.2 mm thick aluminum extrusion that is approximately 100 cm long, 20 cm wide and 5 cm tall under an approximately 40% force of atmospheric pressure, or about 6 pounds per square inch, simulating the pressure differentials that the chamber would experience in normal operating conditions with sea level pressure (approximately 14.7 pounds or 100 kPa) present inside the chamber. This simulation showed that a centered region of the major surface areas of the main housing body experienced an approximately 0.8 mm deflection. Applicants recognize that this amount of outward deflection can produce unacceptable changes in neutron detection efficiency when the main housing body is itself used as a cathode. For example, there can be more than a 5% loss in actual neutrons detected responsive to this decrease in ambient pressure. Conversely, an increase in ambient pressure relative to the pressure in the chamber interior produces an inward deflection resulting in an untenable number of non-neutron events being recorded as detected neutrons. Applicants submit that thermal neutron detector 200 of the present disclosure sweeps aside these concerns, as will be discussed immediately hereinafter.

Applicants have discovered that the practice of using a pressure sealed housing as a cathode or ground plate can be problematic when the housing is subjected to a pressure differential since the pressure-induced movement of the main body housing modifies the electric field within the thermal neutron detector, thereby changing the thermal neutron detection efficiency. In particular, Applicants have determined that a 5% loss, at least to an approximation, of detected thermal neutrons will result responsive to a deflection of 0.5 mm for a thermal neutron detector design in which the distance between the ASM-SS and the cathode surface is approximately 10 mm. Accordingly and in accordance with embodiments of the present disclosure, as seen at least in FIGS. 7 and 8, thermal neutron detector 200 includes main housing body 204 as a structure that is separate or distinct from detector module 230. Cathode/ground plates 238 and 240, FIGS. 7-11, are provided by detector module 230 independent of main housing body 204. Applicants recognize that spacing the ground plates away from the surfaces or walls of the main housing body that they confront provides immunity from pressure induced movement. That is, since the housing and the ground plates, in the present embodiment, are separate structures, deflection or flexing of the major sides and thereby major surface extents of main body housing 204 does not affect the location of the top and bottom cathode surfaces, and therefore does not affect the neutron signal. In other words, the ground plates comprising the major surfaces of the modular thermal neutron detector are unaffected by changes in external pressure since movement of the major sides of the main housing body do not induce movement of the confronting ground plates responsive thereto. By adjusting the cathode plate to main body housing clearance, any contemplated atmospheric pressure differential can be accommodated, even as much as 1 atmosphere, such that the pressure differential essentially has no effect on detection performance. In some embodiments, the atmospheric pressure differential accommodated can be at least 0.2 atmosphere. In this regard, unlimited design flexibility has been provided based on the teachings of the present disclosure. Based on these considerations, the approximate 1 mm deflection of a 3.2 mm thick aluminum main body housing can be accommodated by providing a 1 mm clearance between the cathode plates and the confronting surfaces of the main housing body. Thus, a 3.2 mm thick aluminum can be used for the main housing body material. Any embodiment of a thermal neutron detector which provides major cathode plates/surfaces at a clearance from members of a separate pressure-sealed housing is submitted to fall within the scope of the present disclosure. In this manner, upper and lower major surface extents of the main housing body can flex at least to a limited extent without inducing movement of the detector module.

Applicants recognize that waviness of the ASM-SS, like pressure differential, as well as mechanical shock and vibration, can influence the electric field within a thermal neutron detector, as discussed above with regard to FIGS. 1 and 2, which likewise changes the thermal neutron detection efficiency. Referring to FIGS. 6 and 7, thermal neutron detector 200 again overcomes these concerns by providing main housing body 204 and thermal neutron detector module 230 as separate components wherein the detection module applies tension to the ASM-SS. Aside from the benefits already discussed with regard to pressure differential, mechanical shock and vibration, as well as waviness, there are a number of additional benefits realized through the practice of the present disclosure which are significant but may not be readily apparent to one of ordinary skill in the art, as will be further discussed immediately hereinafter.

First, since the ground plates are physically different pieces than the pressure (i.e., main body) housing, a lower tolerance housing part can be allowed to flex by larger amounts than the previously mentioned 0.5 mm under atmospheric pressure changes, as is the case here with the approximately 0.8 mm deflection of a 3.2 mm thick aluminum housing. This can reduce the weight and cost of the final solution since the thickness and material of the housing can be chosen to deform to a set limit by not hitting/contacting the ground plates, and which does not disturb the seals between the main housing body and end plates 210 and 214 (FIGS. 6 and 7).

Furthermore, by being able to decouple the housing from the cathode plates, different materials can be selected for the now separate challenges of creating a closed chamber that contains a readout gas, and setting the top and bottom cathode surfaces. For example, stainless steel is desirable for the ground plates because stainless steel contains approximately ten times less uranium and thorium traces than aluminum, and therefore ten times fewer alpha decay particles will enter the space between the top or bottom cathode surface and the surfaces of the ASM-SS and to potentially create an erroneous pulse that is counted as a neutron signal. At the same time, a low-cost extruded aluminum can be used for the housing.

In summary, the narrow thermal neutron detector approach of the present disclosure, as brought to light herein, with the housing and ground plate as separate structures, handles the pressure problems, shock and vibration problems, weight and cost of raw material problems, and ease of manufacturing problems described above in ways that are submitted to be heretofore unknown in the prior art.

Figure 15:
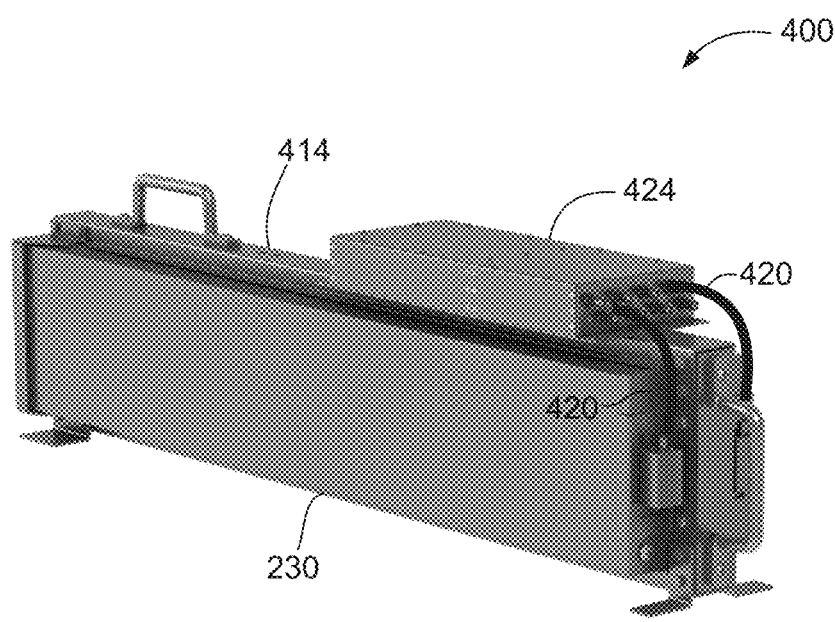
FIG. 15 is a diagrammatic, perspective view of an embodiment of a narrow fissile neutron detection system produced in accordance with the present disclosure.
Figure 16:
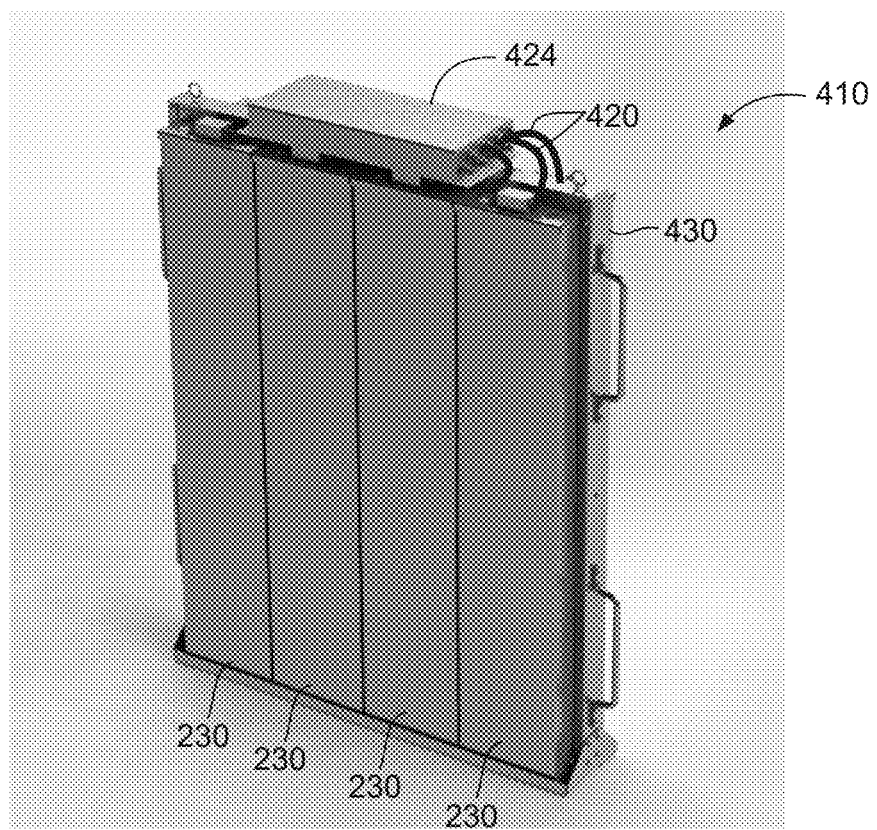
FIG. 16 is a diagrammatic, perspective view of an embodiment of a large surface fissile neutron detection system produced in accordance with the present disclosure.

FIG. 15 illustrates a diagrammatic, perspective view of an embodiment of a narrow fissile neutron detection system, generally indicated by the reference number 400, whereas FIG. 16 illustrates a diagrammatic, perspective view of an embodiment of a large surface fissile neutron detection system, generally indicated by the reference number 410. In system 400, a frame 414 supports first and second thermal neutron detectors 230 (only one of which is clearly visible in the view of FIG. 15) with electrical cables 420 coupled to an electronics unit 424. Moderator material is supported by the frame between the thermal neutron detectors, but is not visible in the view of FIG. 15. Large surface area fissile neutron detector 410 includes two groups of four thermal neutron detectors supported on either side of a frame 430 such that only one group of the thermal neutron detectors is visible in the view of the figure. A moderator material is present between the two opposing groups of side-by-side thermal neutron detectors and is not visible in the view of FIG. 16.

In view of FIGS. 15 and 16, it should be appreciated that narrow thermal neutron detectors can be attached to one another or placed side by side. Moderator materials which slow down fissile neutrons (with energies of 100 keV to 10 MeV) to thermal energies (less than 0.1 eV) can be arranged near the narrow thermal neutron detectors to slow down neutrons before entering the thermal neutron detectors to be detected. Electronics unit 424 can be connected to the narrow thermal neutron detectors to provide high voltage and process the signal pulses from the chambers, and then communicate the neutron signal to users via hardwire or wireless communication pathways.

There are significant strategic benefits realized by producing smaller, thermal neutron detectors that can be placed next to each other in a side-by-side relationship to create larger detection areas at least as a result of the ability to use stock metal parts that are available in long and wide configurations, rather than custom larger material that is approximately 1 m². A further advantage of the narrow thermal neutron detector, as brought to light herein, relates to reduced manufacturing tooling and footprint, and gives greater flexibility in building one standard thermal neutron detector product and configuring a fissile neutron detection system with more or fewer of these standard thermal neutron detectors to meet a customer's need rather than building many different sizes of unique monolithic thermal neutron detectors.

Attention is now directed to FIG. 17 which is a diagrammatic partially cutaway illustration, in an elevational end view, of another embodiment of a thermal neutron detector produced in accordance with the present disclosure and generally indicated by the reference number 500. As is the case with thermal neutron detector 200 of FIG. 6, narrow housing 204 can be utilized in order to address deflection tolerances resulting from external pressure changes due to changing altitude, barometric pressure, and/or temperature.

Narrow thermal neutron detector 500 likewise includes still further design advancements which provide the benefits described above with regard to thermal neutron detector 200. In this embodiment, a thermal neutron detector module 502 includes an upper electrode ground plate 504 and a lower ground plate 508 to provide structure for module 502 as well as top and bottom cathode surfaces. Each lengthwise edge of the upper and lower electrode ground plates includes a tab, rim or foot 510 that is receivable against the major interior surfaces of housing 204 with thermal neutron detector module 502 received at an installed position within the housing. Flexural sidewalls 520 are fixedly attached to lengthwise edges 524 of support structure 18 in any suitable manner such as, for example, by using fasteners to maintain a spaced apart relationship between. An outer lengthwise edge margin 528 of each flexural sidewall resiliently biases against an associated tab 510 to apply tension force 340 responsive to biasing against tabs 510. A spaced apart relationship between upper electrode ground plate 504 and lower electrode ground plate 508 can be maintained in any suitable manner such as, for example, by using appropriate fasteners (e.g., rivets) to attach each edge margin 528 to an associated tab 510. Flexural sidewalls 520 can be formed from any suitable material such as, for example, stainless steel or aluminum. In applying a resiliently derived tension force, the flexural sidewalls effectively serve as springs, which is not unlike the behavior of sidewall 244 in FIGS. 7-10. It should be appreciated that major walls of housing 204 are in a confronting relationship with upper and lower electrode plates 504 and 508 such that the housing major surfaces can deflect responsive, for example, to ambient pressure changes without causing unacceptable movement of the upper and lower electrode plates in response. At the same time, tension force 340 mitigates against the adverse effects of mechanical shock and vibration. In another embodiment, one of sidewalls 520 can be replaced by a rigid sidewall such that a single sidewall 520 applies tension force 340.

Turning to FIG. 18, a diagrammatic partially cutaway illustration, in an elevational end view, is shown of another embodiment of a thermal neutron detector produced in accordance with the present disclosure and generally indicated by the reference number 600. Again, narrow housing 204 can be utilized in order to address deflection tolerances resulting from external pressure changes due to changing altitude, barometric pressure, and/or temperature. Narrow thermal neutron detector 600 likewise includes still further design advancements which provide the benefits described above with regard to thermal neutron detectors 200 and 500. In this embodiment, a thermal neutron detector module 602 includes upper electrode ground plate 504 and lower ground plate 508 to provide structure for module 602 as well as top and bottom cathode surfaces. Sidewalls 520 again bias against tabs 510, but, in this embodiment, sidewalls 520 are attached to lengthwise edges of a first support structure 18a which supports active sheet material 16a and a second support structure 18b which supports active sheet material 16b. In this way, tension force 340 is applied to both support structures 18a and 18b. An intermediate set of electrodes 620 is present between the support structures in the present embodiment. As is the case in other embodiments, one of sidewalls 520 can be replaced by a rigid sidewall such that a single sidewall 520 applies tension force 340.

FIG. 19 is a diagrammatic, partially cutaway end view, in elevation, of another embodiment of a narrow thermal neutron detector, generally indicated by the reference number 700. A thermal neutron detector module 702 is received in an elongated housing 708. The latter can be dimensionally the same as previously described housing 204, but also includes lengthwise retainers 710 that receive a first electrode plate 720 and a second electrode plate 724 of thermal neutron detector module 702. Housing 708 can be formed, for example, as an aluminum extrusion such that retainers 710 are integrally formed. As in FIGS. 17 and 18, sidewalls 520 provide tension force 340 on support structure 18, in this instance, by resiliently biasing against retainers 710.

FIG. 20 is a diagrammatic, partially cutaway end view, in elevation, of another embodiment of a narrow thermal neutron detector, generally indicated by the reference number 800. In this embodiment, an elongated housing 808 can be dimensionally the same as previously described housing 204, but also includes lengthwise tabs 810. Housing 808 can be formed, for example, as an aluminum extrusion such that tabs 810 are integrally formed. As in FIGS. 17-19, sidewalls 520 provide tension force 340 on support structure 18 and active sheet layer 16, in this instance, by resiliently biasing against tabs 810.

Figure 21:
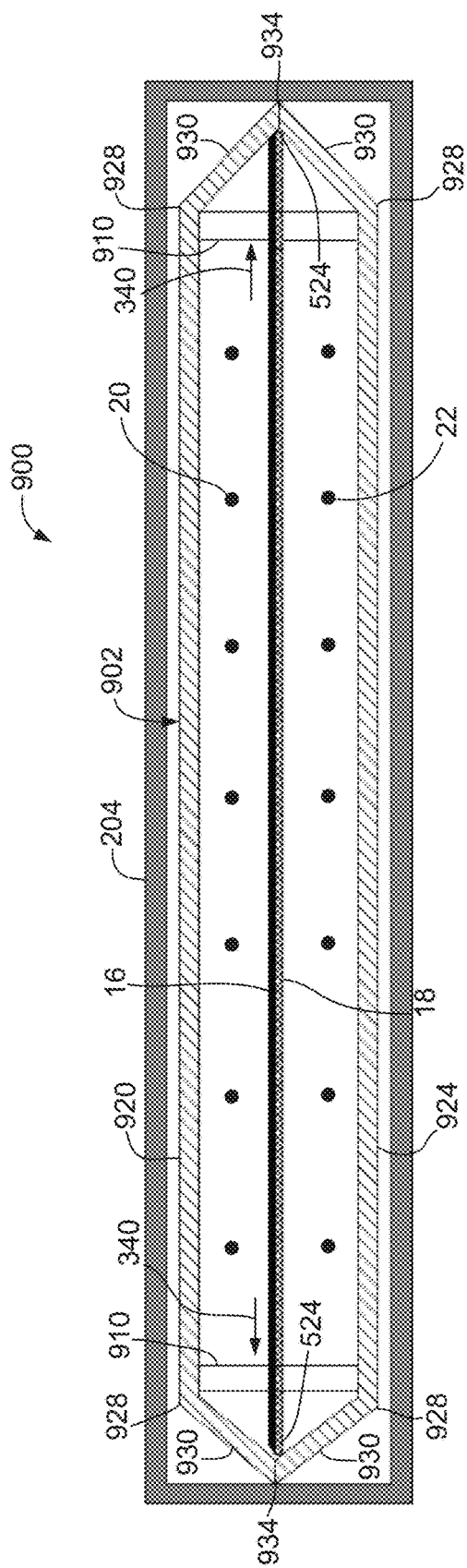

FIG. 21 is a diagrammatic, partially cutaway end view, in elevation, of another embodiment of a narrow thermal neutron detector, generally indicated by the reference number 900. A thermal neutron detector module 902 is received in elongated housing 204. A first electrode plate 920 and a second electrode plate 924 of thermal neutron detector module 902 are held in the illustrated spaced apart relationship by structural members 910. These structural members can comprise, by way of non-limiting example, a series of posts of any suitable shape spaced along the length of the module and/or continuous walls. The first and second electrode plates include bends 928 such that lengthwise edge bevels 930 are forced against one another at 934 due to structural members 910. Lengthwise edges 524 of support structure 18 are attached to one or both of lengthwise edge bevels 930 to provide tension force 340.

Figure 22:
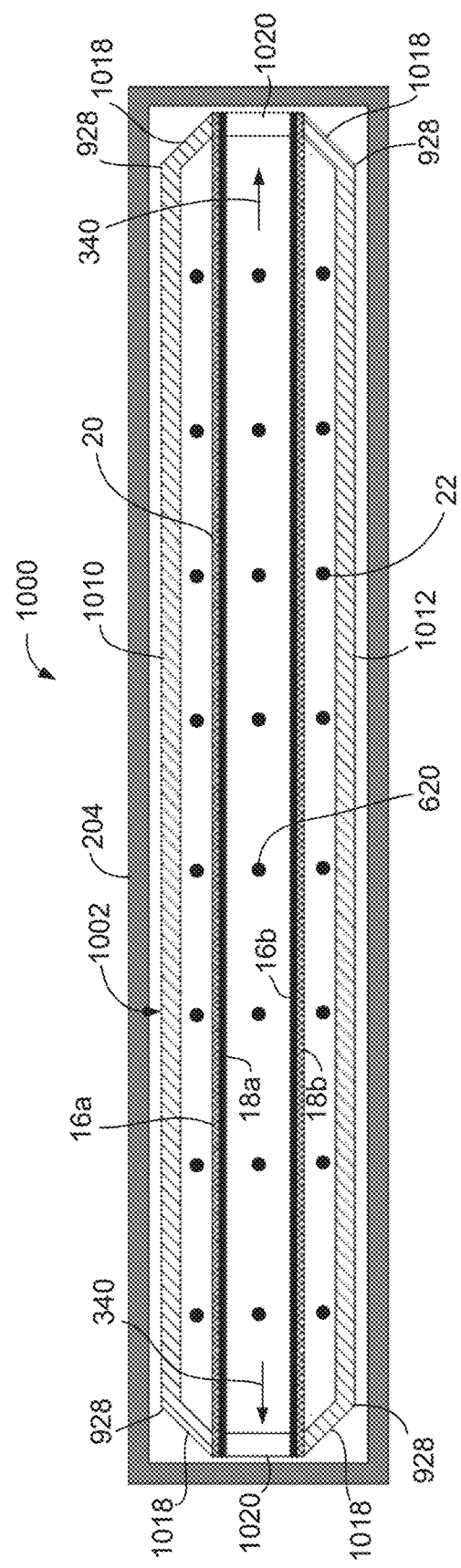

FIG. 22 is a diagrammatic partially cutaway illustration, in an elevational end view, showing another embodiment of a thermal neutron detector produced in accordance with the present disclosure and generally indicated by the reference number 1000. Again, narrow housing 204 can be utilized in order to address deflection tolerances resulting from external pressure changes due to changing altitude, barometric pressure, and/or temperature. Narrow thermal neutron detector 1000 likewise includes still further design advancements which provide the benefits described above with regard to thermal neutron detectors 200 and 500. In this embodiment, a thermal neutron detector module 1002 includes upper ground plate 1010 and lower ground plate 1012 to provide structure for module 1002 as well as top and bottom cathode surfaces. Lengthwise margins of the ground plates include bevels 1018. The ground plates can be held in the illustrated spaced apart relationship by sidewalls 1020. Support structures 18*a* and 18*b* can be attached, for example, to an associated one of bevels 1018 to apply tension 340 to the support structures 18*a* and 18*b* and thereby to active sheet material layers 16*a* and 16*b*, respectively.

Figure 23:
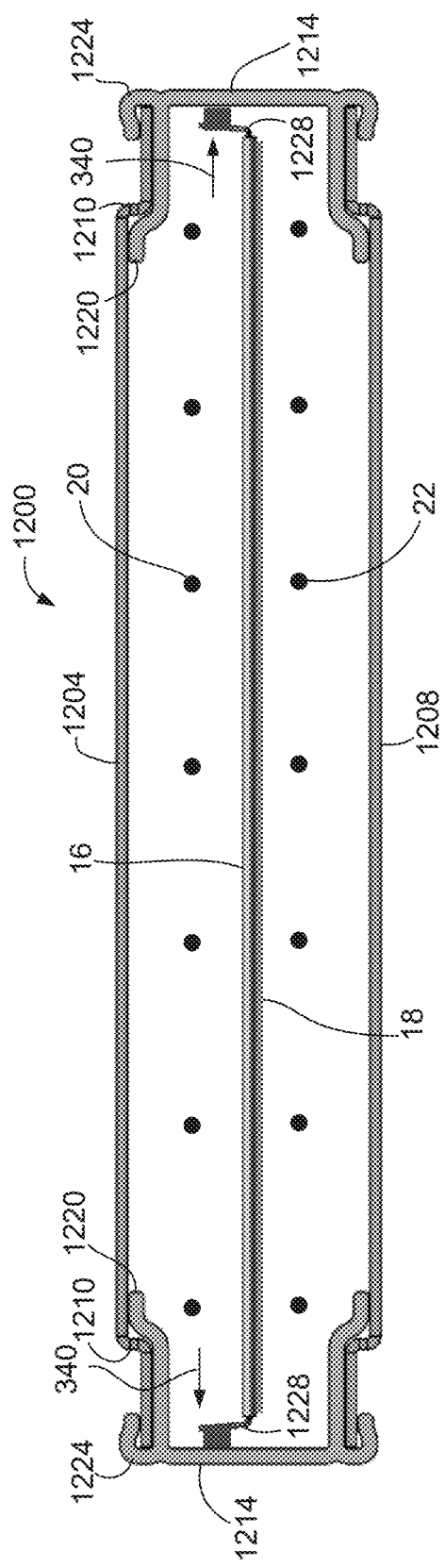

FIG. 23 is a diagrammatic partially cutaway illustration, in an elevational end view, showing another embodiment of a thermal neutron detector produced in accordance with the present disclosure and generally indicated by the reference number 1200. Narrow thermal neutron detector 1200 includes an upper electrode ground plate 1204 and a lower ground plate 1208 to provide structure as well as top and bottom cathode surfaces. Lengthwise margins of the ground plates include a shoulder 1210. Given that the upper and lower plates are identical, reference numbers with regard to detailed structural features have been applied only to upper ground plate 1204. Side plates 1214 are configured to latch to the ground plates to maintain them in a spaced apart relationship using a flange 1220 and a U-channel 1224. At the same time, support structure 18 can define side tabs 1228 that are attached to side plates 1214 such that tension 340 is applied to support structure 18 and, thereby, to active sheet material 16. In another embodiment, wedge-shaped endcaps (for reference, see endcaps 210 and 214 of FIGS. 6 and 7) can drive sidewalls 1214 away from one another to apply tension 340.

Referring to FIGS. 24*a*-24*c*, an embodiment of a slidable thermal neutron detector insert or module is diagrammatically shown and is generally indicated by the reference number 1300. FIG. 24*a* is diagrammatic partially exploded view in perspective, FIG. 24*b* is a diagrammatic partially cutaway end view in elevation, and FIG. 24*c* is a diagrammatic partially cutaway side view, in elevation. In this embodiment, module 1300 is slidably receivable in housing 204 as indicated by an arrow 1304 in FIG. 24*a*. The slidable thermal neutron detector can include support structure 18 and active sheet material 16 with the former being supported by lengthwise side spacers or legs 1308. When installed the side spacers that extend from support structure 18 to bias against housing body 204. The side spacers can be in any suitable form that is sufficient to adequately hold support structure 18, along with the active sheet material, and be fabricated from any suitable material such as, for example, stainless steel or aluminum. FIG. 24*c* illustrates electrode sets 20 and 22 supported by end plates 210 and 214. Thermal neutron detector module 1300 can be slidingly located and received at an installed position in housing 204 followed by installing electrode sets 20 and 24 on end plates 210 and 214 in electrical isolation in a manner that is consistent with the descriptions above. Where spacers 1308 are substantially rigid, tension force 340 can be applied, for example by stretching support structure 18 between spacers 1308 prior to attachment thereto.

Figure 25A:
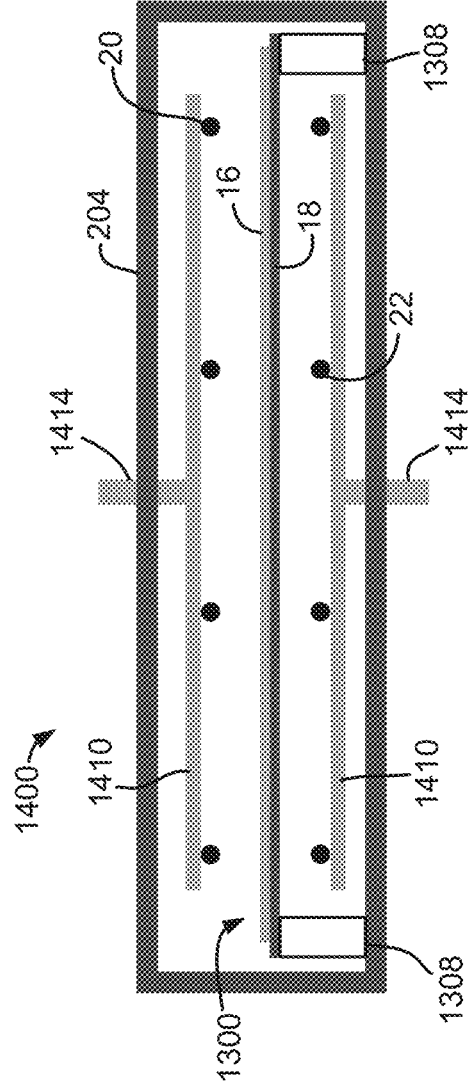
FIG. 25a is a partially cutaway diagrammatic end view, in elevation, of another embodiment of a narrow thermal neutron detector with a slidably installable thermal neutron detector module, produced in accordance with the present disclosure.
Figure 25B:
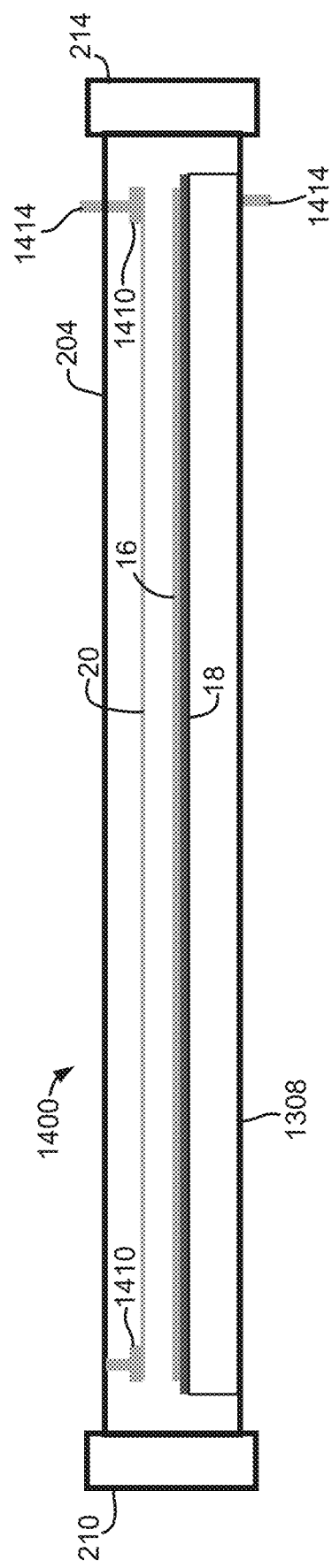

Referring to FIGS. 25*a* and 25*b*, another embodiment of a narrow thermal neutron detector is diagrammatically shown, generally indicated by the reference number 1400, and includes slidable thermal neutron detector insert or module 1300 of FIG. 24*a* as well as housing 204. FIG. 25*a* is a partially cutaway end view in elevation while FIG. 25*b* is a partially cutaway side view in elevation. In this embodiment, the opposing ends of the electrodes of the electrode sets are supported by ganging boards 1410 (FIG. 25*a*) that are electrically coupled to feedthroughs 1414 that pass through housing 204 with appropriate electrical isolation from the housing. In this embodiment, module 1300 is slidingly received to an installed position, not including the electrodes. The electrode ends can be installed on ganging boards 1410 before or after module 1300 is installed.

Figure 26A:
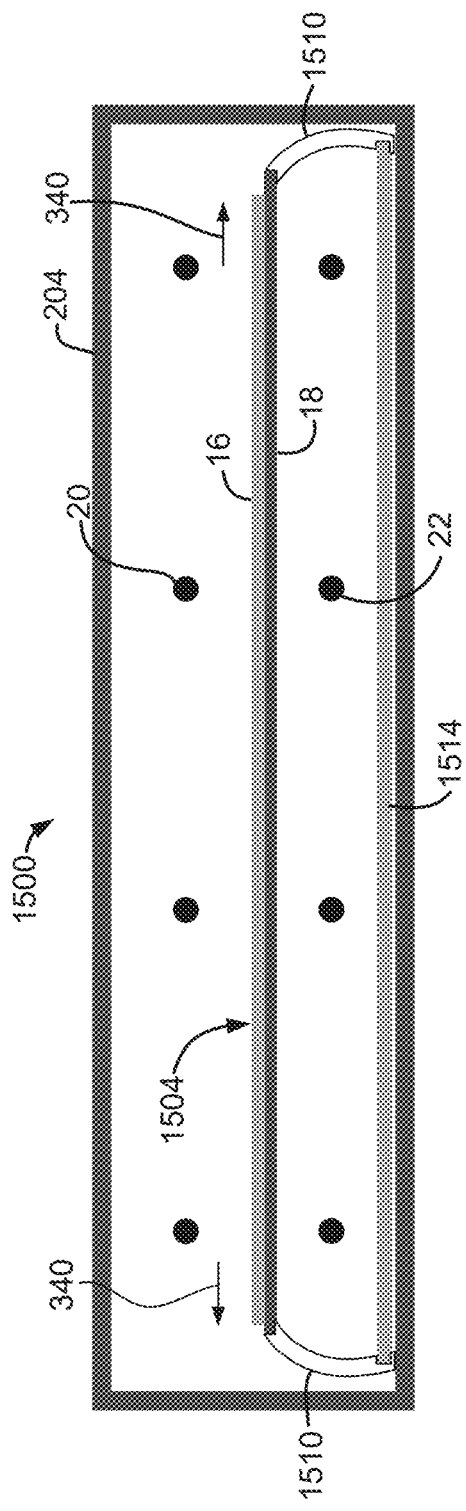
FIG. 26a is a partially cutaway diagrammatic end view, in elevation, illustrating a narrow thermal neutron detector including a thermal neutron detector module with flexible side spacers, in accordance with the present disclosure.
Figure 26B:
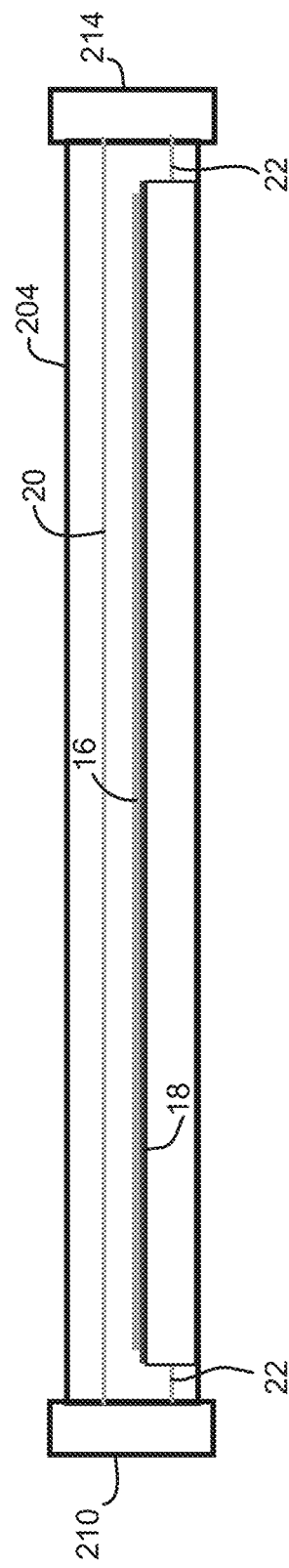

FIGS. 26*a* and 26*b* diagrammatically illustrate another embodiment of a narrow thermal neutron detector, generally indicated by the reference number 1500. FIG. 26*a* is a partially cutaway end view in elevation while FIG. 26*b* is a partially cutaway side view in elevation. In this embodiment, a thermal neutron detector module 1504 is slidably installable into housing 204. Module 1504 includes support structure 18 and active sheet material 16. The module further includes lengthwise flexible side spacers 1510 and a ground plate 1514 to which the side spacers are attached. As seen in FIG. 26*a*, side spacers 1510 are resiliently deformed such that flexural tension 340 is applied to structural support 18. As in FIG. 25*a*, the opposing ends of the electrodes in the electrode sets can be supported by ganging boards that are installed on housing 204 with feedthroughs that pass through the housing with appropriate electrical isolation therefrom. In another implementation, module 1504 can be slidingly installed to a final position followed by installing the electrodes on end plates 210 and 214 in an electrically isolating manner such that electrical communication can pass through one or both end plates. Side spacers 1510 can be in any suitable form that is sufficient to adequately hold and tension support structure 18, along with the active sheet material, and be fabricated from any suitable material such as, for example, stainless steel or aluminum.

Figure 27A:
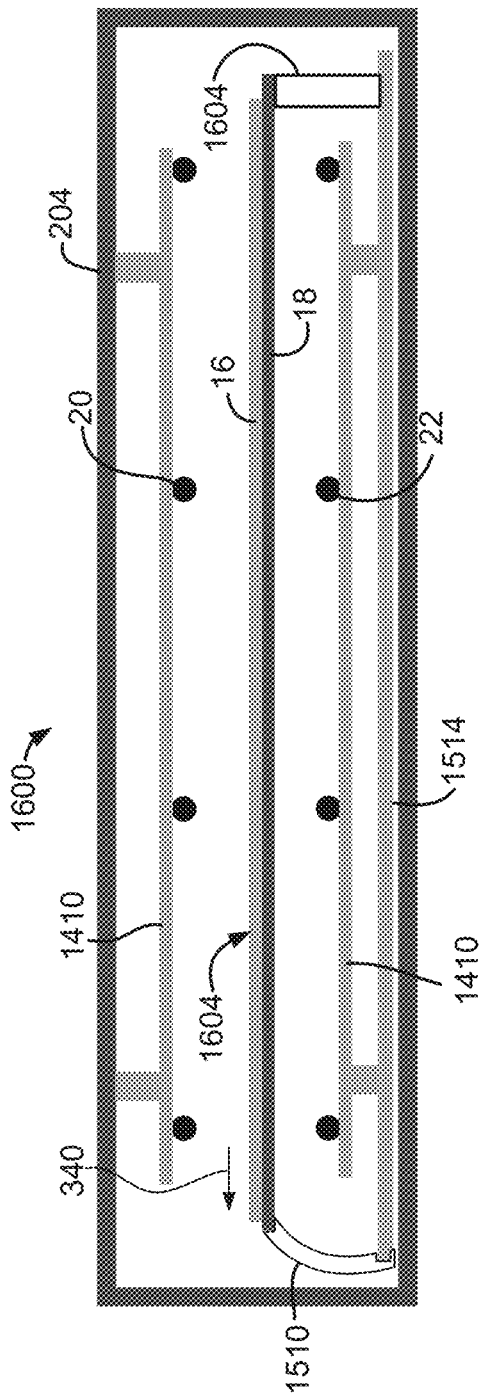
FIG. 27a is a partially cutaway end view, in elevation, of an embodiment of a narrow thermal neutron detector including one rigid and one flexible side spacer, produced in accordance with the present disclosure.
Figure 27B:
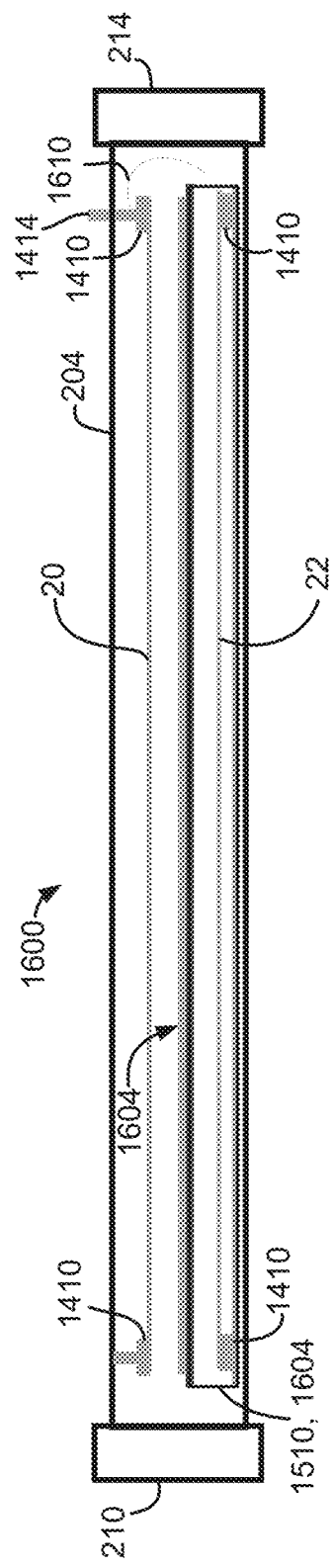

FIGS. 27a and 27b diagrammatically illustrate another embodiment of a narrow thermal neutron detector, generally indicated by the reference number 1600. FIG. 27a is a partially cutaway end view in elevation while FIG. 27b is a partially cutaway side view in elevation. In this embodiment, a thermal neutron detector module 1604 is slidably installable into housing 204. Module 1604 includes support structure 18 and active sheet material 16. The module further includes one lengthwise flexible side spacer 1510 attached to ground plate 1514. Proximate to an opposing lengthwise edge of ground plate 1514, a spacer 1604 is supported that can be rigid. Spacer 1510 has been rendered as transparent in FIG. 27b for illustrative purposes and can be configured in any suitable shape. These spacers can be fabricated from any suitable material such as, for example, stainless steel and aluminum. As is the case with other lengthwise spacers described herein, it is not a requirement for each spacer to be continuous along the entire lengthwise edge of support structure 18. As seen in FIG. 27a, side spacer 1510 is resiliently deformed such that flexural tension 340 is applied to structural support 18. As in FIG. 25a, the opposing ends of the electrodes in the electrode sets can be supported by ganging boards 1410 that are installed on main housing body 204 with feedthrough(s) 1414 (FIG. 25a) that pass through either housing 204 and/or endplates 210, 214 with appropriate electrical isolation therefrom. A ganging clip 1610 electrically couples the ganging boards to one another. The electrodes can be installed on the ganging boards before or after module 1604 is installed. In other embodiments, one set of electrodes such as, for example, the first set of electrodes (or a single, first electrode) can be supported by the main housing body, as shown, using a ganging board while the other set of electrodes (or a single, second electrode) is supported by end plates 210 and 214 (see FIG. 26b). It is noted that such an implementation, at least insofar as the electrode arrangement is concerned, is not limited to the embodiment of FIGS. 27a and 27b.

Figure 28:
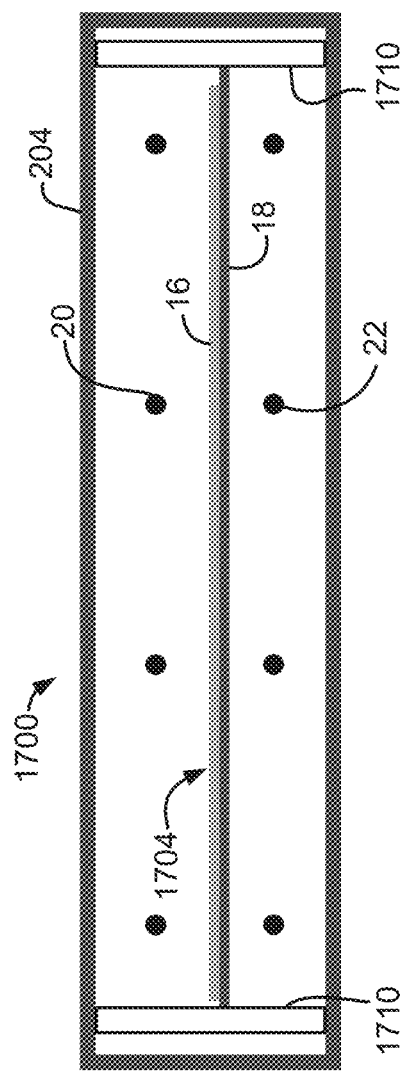
FIG. 28 diagrammatically illustrates another embodiment of a narrow thermal neutron detector in an elevational, end view including rigid side spacers and produced in accordance with the present disclosure.

FIG. 28 diagrammatically illustrates another embodiment of a narrow thermal neutron detector, generally indicated by the reference number 1700 in a partially cutaway end view, in elevation. In this embodiment, a thermal neutron detector module 1704 is slidably installable into housing 204. Module 1704 includes support structure 18 and active sheet material 16. The module further includes lengthwise side spacers 1710 that extend across the height of housing 204. The electrode sets can be supported either by ganging boards or by end plates in a manner that is consistent with the descriptions above.

Figure 29A:
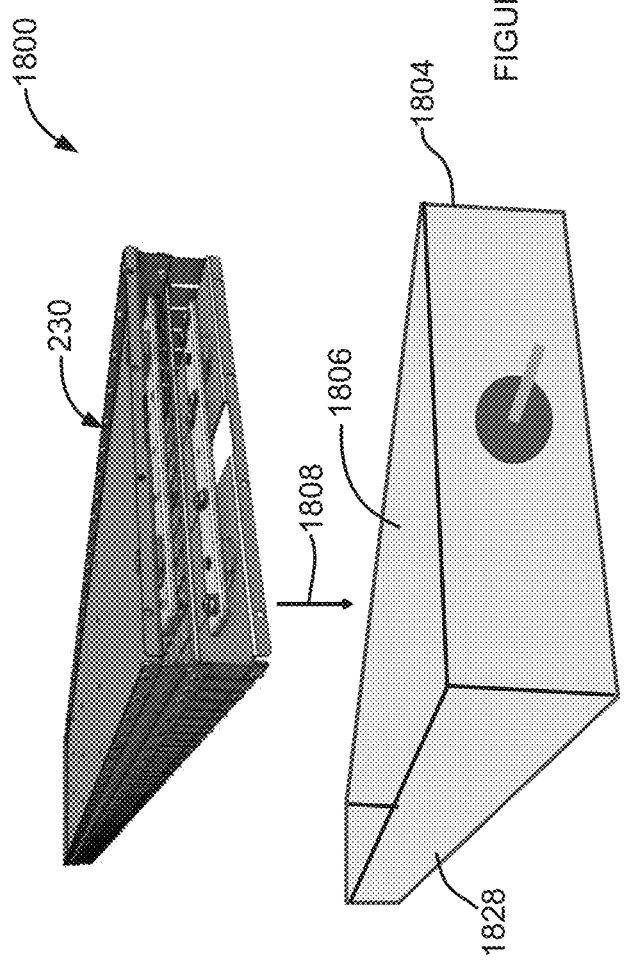
FIG. 29a is a diagrammatic illustration, in a partially exploded perspective view, of still another embodiment of a thermal neutron detector produced in accordance with the present disclosure, illustrating a thermal neutron detector module in relation to a main body housing.
Figure 29C:
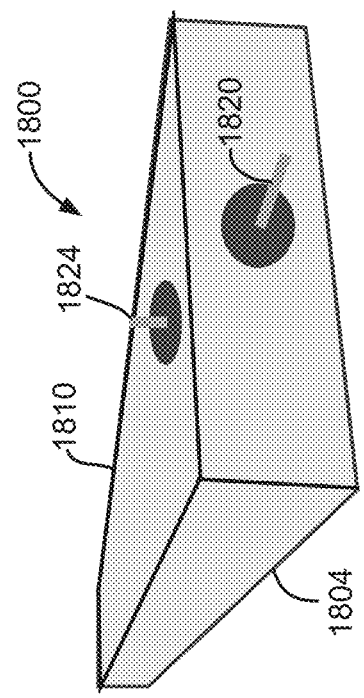
FIG. 29c is a diagrammatic assembled view, in perspective, of the embodiment of FIGS. 29a and 29b.
Figure 29B:
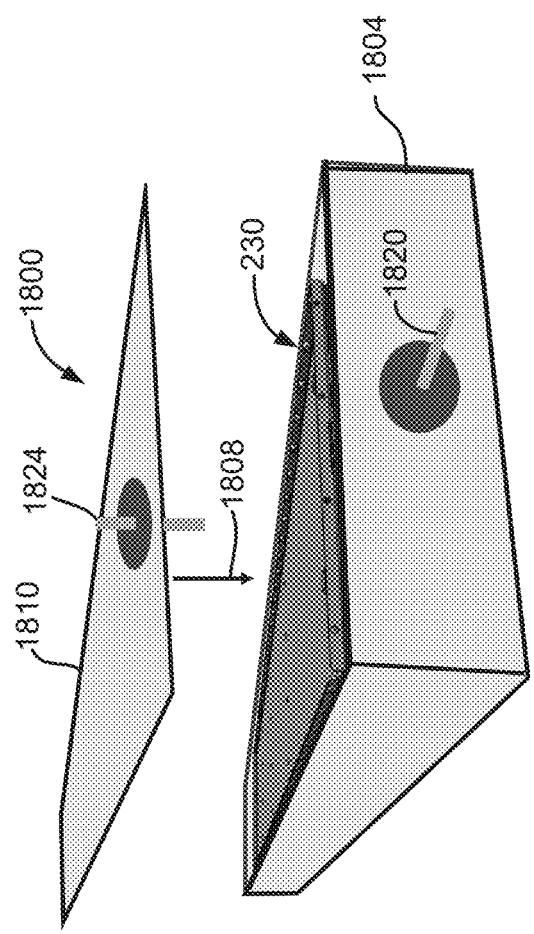
FIG. 29b is another diagrammatic illustration, in another partially exploded perspective view, of the embodiment of FIG. 29a, shown here to further illustrate a lid for the main body housing.

FIGS. 29a-29c, diagrammatically illustrate an embodiment of a thermal neutron detector produced in accordance with the present disclosure and generally indicated by the reference number 1800. FIG. 29a is a partially exploded view, in perspective. FIG. 29b is another partially exploded view, in perspective. FIG. 29c is an assembled view, in perspective. FIG. 29a illustrates previously described thermal neutron detector module 230 positioned adjacent to a tray housing 1804. The latter, for example, can include a width, length and thickness corresponding to that of previously described housing 204. Given that the top, in the view of FIG. 29a, of tray housing 1804 defines an opening 1806, module 230 can readily be received in the interior that is defined by the tray housing, as indicated by an arrow 1808 and shown in FIG. 29b. The latter also illustrates a lid 1810 prior to its installation on tray housing 1804 for sealing a readout gas within the chamber that is cooperatively defined by the tray housing and lid. In one embodiment, an electrical feedthrough 1820 can be provided on an end wall of the tray housing in electrical communication, for example, with the ganging boards of module 230. In another embodiment, an electrical feedthrough 1824 can be provided in lid 1810 in electrical communication, for example, with the ganging boards of module 230. Tray housing 1804 and lid 1810 can be formed from any suitable material including but not limited to aluminum and stainless steel. Lid 1810 can be sealed to housing tray 1804 in any suitable manner such as, for example, by seam welding or by forming a hermetic seal using a suitable sealant. After installation, lid 1810 forms one of the major surfaces of an overall housing assembly. Based on FIGS. 29a-29c, in another embodiment, the tray housing can define a side opening, instead of opening 1806. In this embodiment, a side wall 1828 can be replaced with an opening that receives a complementary lid while opening 1806 can be integrally closed by a major wall.

Figure 30:
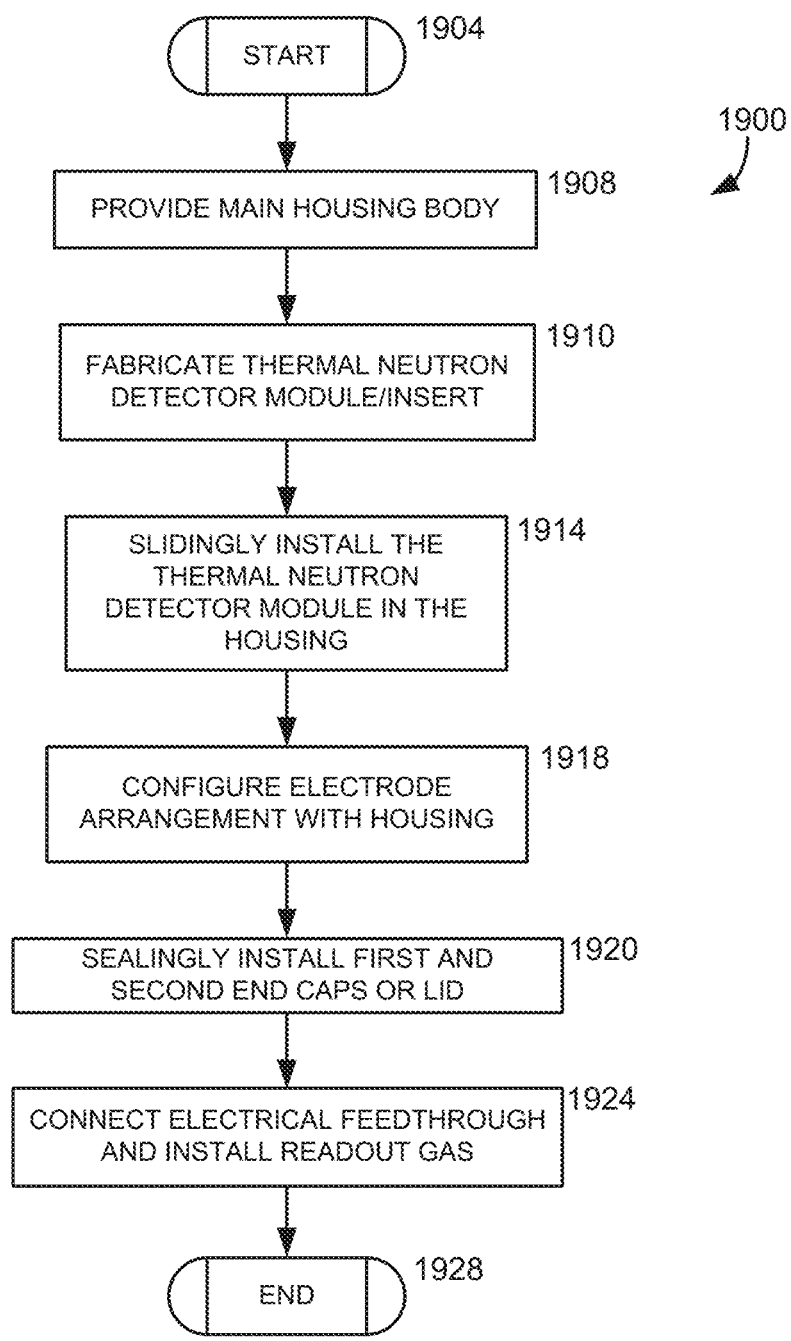
FIG. 30 is a flow diagram illustrating an embodiment of a method for producing a thermal neutron detector in accordance with the present disclosure.

FIG. 30 is a flow diagram that illustrates an embodiment of a method for producing a thermal neutron detector in accordance with the present disclosure, generally indicated by the reference number 1900. Method 1900 starts at 1904 and proceeds to 1908 at which a main housing body is provided that can define first and second opposing end openings leading into a housing cavity to define a housing length between the first and second end openings. At 1910, an ionization type thermal neutron detector module is fabricated having a peripheral outline that is complementary to the main housing body within the housing cavity and is slidably receivable in an installed position within the housing cavity, the ionization detector module having a length, a width and a height with the height being less than each of the length and the width and supporting an active sheet layer to span at least a majority of said length and width. At 1914, the thermal neutron detector module can be slid into the main housing body to an operational or installed position. In an embodiment that utilizes a housing tray as the main housing body, the thermal neutron detector module is received in the cavity of the housing. At 1918, an electrode arrangement is configured in the main housing body to include at least a first electrode and a second electrode within the main housing body in a spaced apart relationship with the active sheet layer, with the ionization detector module in the installed position, such that each of the first electrode and the second electrode is oppositely proximate to one of a pair of opposing major surfaces of the active sheet layer. At 1920, a first end cap and a second end cap are sealingly installed on the opposing end openings of the main housing body. In another embodiment, a lid is sealingly installed onto a housing tray or other such suitable housing. At 1924, the electrical feedthroughs are installed and electrically connected to the electrode arrangement. The readout gas is installed. At 1928, the method concludes. It is noted that the individual steps that have been shown can be modified in any suitable manner in view of the teachings herein. Moreover, the specific sequence of these steps, as shown, is not intended as limiting and the steps may be reordered into any suitable sequence.

The foregoing description of the invention has been presented for purposes of illustration and description. It is not intended to be exhaustive or to limit the invention to the precise form or forms disclosed, and other modifications and variations may be possible in light of the above teachings. Accordingly, those of skill in the art will recognize certain modifications, permutations, additions and sub-combinations of the embodiments described above.

What is claimed is:

1. A thermal neutron detector for detecting thermal neutrons, said thermal neutron detector comprising:
a housing defining a housing cavity;
an ionization detector module having a peripheral outline that is complementary to the housing within the housing cavity, the ionization detector module having a length, a width and a height with the height being less than each of the length and the width, the ionization detector module including a framework to which an active sheet layer is fixedly attached, the framework including an opposing pair of lengthwise side margins extending between another pair of widthwise side margins to define a rectangular shape supporting the active sheet layer to span at least a majority of said length and width and a support to engage at least one of the lengthwise side margins of the framework to apply a tension force to the framework between the lengthwise side margins such that the active sheet layer is under tension across the width of the ionization detector module;
an electrode arrangement including at least a first electrode and a second electrode within said housing in a spaced apart relationship with said active sheet layer, with the ionization detector module in the installed position, such that each of the first electrode and the second electrode is oppositely proximate to one of a pair of opposing major surfaces of the active sheet layer;
an electrical feedthrough extending through the housing; and
an electrical conductor extending through the electrical feedthrough for electrical communication with the electrode arrangement,
the housing containing a readout gas in communication with said active sheet layer and said electrode arrangement such that, responsive to an electrical bias applied to the electrode arrangement by the electrically conductive arrangement and responsive to incident thermal neutrons, an electrical detection current is generated on the electrode arrangement.

2. The thermal neutron detector of claim 1 wherein the first electrode is supported by the housing and the second electrode is supported by the ionization detector module.

3. The thermal neutron detector of claim 1 wherein said electrode arrangement includes a first set of electrodes made up of a first plurality of electrodes which includes the first electrode and a second set of electrodes made up of a second plurality of electrodes which includes the second electrode such that each of the first set of electrodes and the second set of electrodes is oppositely proximate to one of the pair of opposing major surfaces of the active sheet layer with the electrode arrangement spanning at least the majority of said length and width.

4. The thermal neutron detector of claim 3 wherein the first set of electrodes is supported by the housing and the second set of electrodes is supported by the ionization detector module.

5. The thermal neutron detector of claim 1 wherein the housing includes an orthorectangular outline.

6. The thermal neutron detector of claim 1 wherein said active sheet layer is Li-6.

7. The thermal neutron detector of claim 1 wherein the electrode arrangement is supported by the ionization detector module.

8. The thermal neutron detector of claim 1 wherein the tension force limits movement of the active sheet layer responsive to mechanical shock and vibration and enhances flatness of the active sheet layer as compared to an active sheet layer that is not under tension.

9. The thermal neutron detector of claim 1 wherein the support directly engages both of the lengthwise side margins.

10. The thermal neutron detector of claim 1 wherein the support applies the tension force as a resilient biasing force.

11. The thermal neutron detector of claim 1 wherein the support applies the tension force as a flexural force.

12. The thermal neutron detector of claim 1 wherein the ionization detector module includes an upper ground plate and a lower ground plate forming upper and lower major extents, respectively, of the ionization detector module, each of the upper ground plate and the lower ground plate including lengthwise edges to form a first pair of lengthwise edges proximate to one side of the housing and a second pair of lengthwise edges proximate to an opposite side of the housing and the support includes at least a first side spacer extending between the first pair of lengthwise edges configured to apply the tension force.

13. The thermal neutron detector of claim 12 wherein the first side spacer is resiliently flexed in an installed configuration to apply the tension force.

14. The thermal neutron detector of claim 12 wherein the support includes a second side spacer extending between the second pair of lengthwise edges cooperating with the first side spacer to apply the tension force in a way that compresses the first and second ground plates.

15. The thermal neutron detector of claim 1 wherein the housing includes housing upper major surface extents and housing lower major surface extents within the housing and the ionization detector module includes module upper major surface extents and module lower major surface extents such that, in the installed position, the module upper major surface extents are in a first spaced apart confronting relationship with the housing upper major surface extents to define a first clearance therebetween and the module lower major surface extents are in a second spaced apart confronting relationship with the housing lower major surface extents to define a second clearance therebetween and responsive at least to ambient pressure change, the housing upper and lower surface extents mechanically flex relative to the module upper and lower surface extents, respectively, to isolate the ionization detector module from deflections of the housing upper and lower surface extents responsive to the ambient pressure change.

16. The thermal neutron detector of claim 15 wherein the ionization detector module is resiliently supported within the main housing body to provide the first and second clearances.

17. The thermal neutron detector of claim 16 wherein an upper ground plate defines the upper module major surface extents and a lower ground plate defines the lower module major surface extents and a plurality of spring slides are fixedly attached to the upper and lower ground plates to maintain the first and second clearances such that each of the upper and lower major surface extents of the main housing body can flex at least to a limited extent without inducing movement of the ionization detector module in response thereto.

18. The thermal neutron detector of claim 15 wherein the tension force limits movement of the active sheet layer responsive to mechanical shock and vibration and enhances flatness of the active sheet layer as compared to an active sheet layer that is not under tension.

* * * * *